US012062506B2

(12) United States Patent
Huang et al.

(10) Patent No.: US 12,062,506 B2
(45) Date of Patent: Aug. 13, 2024

(54) ILLUMINATED KEYSWITCH STRUCTURE AND ILLUMINATING MODULE

(71) Applicant: Darfon Electronics Corp., Taoyuan (TW)

(72) Inventors: Heng-Yi Huang, Taoyuan (TW); Hsin-Cheng Ho, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/353,925

(22) Filed: Jul. 18, 2023

(65) Prior Publication Data

US 2023/0377818 A1 Nov. 23, 2023

Related U.S. Application Data

(63) Continuation of application No. 17/847,853, filed on Jun. 23, 2022, now Pat. No. 11,728,110, which is a (Continued)

(51) Int. Cl.
*H01H 13/83* (2006.01)

(52) U.S. Cl.
CPC ..... *H01H 13/83* (2013.01); *H01H 2221/0702* (2013.01)

(58) Field of Classification Search
CPC ........... H01H 13/83; H01H 2221/0702; H01H 3/125; H01H 2219/056; H01H 2219/06;
(Continued)

(56) References Cited

U.S. PATENT DOCUMENTS 6,860,612 B2 3/2005 Chiang et al.
8,313,204 B2 11/2012 Lin
(Continued)

FOREIGN PATENT DOCUMENTS

CN 202871650 U 4/2013
CN 110010397 A 7/2019
(Continued)

OTHER PUBLICATIONS

Non-Final Office Action issued in U.S. Appl. No. 17/510,597, filed Oct. 26, 2021, mailed Jul. 7, 2022.

*Primary Examiner* — Lheiren Mae A Caroc
(74) *Attorney, Agent, or Firm* — McClure, Qualey & Rodack, LLP

(57) ABSTRACT

An illuminated keyswitch structure and an illuminating module thereof are provided. A base plate has an opening. The illuminating module includes a drive circuit board, having a face reflector and at least one dot reflector disposed thereon, a spacer adhered on the drive circuit board and having a through hole and an adhesive-less clearance fringe at least partially surrounding the through hole, a light-emitting part disposed on the drive circuit board and proximate to the face reflector and the dot reflector, and a translucent covering structure covering above the light-emitting part and including a reflective layer. The reflective layer reflects off light from the light-emitting part, and the face reflector and/or the at least one dot reflector reflect light to pass through the through hole of the spacer and then illuminate upward through the translucent covering structure and further through the opening of the base plate.

15 Claims, 16 Drawing Sheets

Related U.S. Application Data continuation-in-part of application No. 17/234,808, filed on Apr. 20, 2021, now Pat. No. 11,764,004.

(60) Provisional application No. 63/325,623, filed on Mar. 31, 2022.

(58) Field of Classification Search
CPC ....... H01H 2219/062; H01H 2219/066; H01H 13/023; H01H 13/04; H01H 13/14; H01H 13/52; H01H 2219/014; H01H 2219/036; H01H 2219/037
See application file for complete search history.

(56) References Cited

U.S. PATENT DOCUMENTS

| | | | | |
|---|---|---|---|---|
| 8,714,850 | B2 | 5/2014 | Ho et al. | |
| 9,269,509 | B2 | 2/2016 | Ho et al. | |
| 9,892,874 | B2 | 2/2018 | Chen | |
| 10,234,619 | B2 | 3/2019 | Chen et al. | |
| 10,340,098 | B2 | 7/2019 | Pan et al. | |
| 11,158,470 | B2 | 10/2021 | Yen et al. | |
| 11,574,778 | B2 | 2/2023 | Huang et al. | |
| 11,728,110 | B2 * | 8/2023 | Huang | H01H 13/83 200/310 |
| 11,764,004 | B2 * | 9/2023 | Huang | H01H 13/14 200/314 |
| 2013/0271948 | A1 | 10/2013 | Chang et al. | |
| 2019/0228930 | A1 | 7/2019 | Lin | |
| 2020/0301523 | A1 | 9/2020 | Ho et al. | |
| 2020/0301524 | A1 | 9/2020 | Ho et al. | |
| 2021/0012984 | A1 | 1/2021 | Chen | |
| 2022/0216018 | A1 | 7/2022 | Huang et al. | |

FOREIGN PATENT DOCUMENTS

| | | | |
|---|---|---|---|
| TW | M432082 | U1 | 6/2012 |
| TW | 201703088 | A | 1/2017 |
| TW | 201710618 | A | 3/2017 |
| TW | 202871650 | A | 4/2017 |
| TW | 201721694 | A | 6/2017 |
| TW | I624851 | B | 5/2018 |
| TW | 201820366 | A | 6/2018 |
| TW | 201917759 | A | 5/2019 |

* cited by examiner

ILLUMINATED KEYSWITCH STRUCTURE AND ILLUMINATING MODULE

CROSS REFERENCE TO RELATED APPLICATIONS

This application is a continuation application of and claims the priority benefit of U.S. application Ser. No. 17/847,853, filed on Jun. 23, 2022, which was a continuation-in-part application of and claimed the priority benefit of U.S. application Ser. No. 17/234,808, filed on Apr. 20, 2021, which claimed the priority benefit of Taiwan patent application No. 110100264, filed on Jan. 5, 2021, and also claimed the priority benefit of China Patent application No. 202110441985.1, filed on Apr. 23, 2021 and U.S. application Ser. No. 63/325,623, filed on Mar. 31, 2022. The entirety of the above-mentioned patent application is hereby incorporated by reference herein and made a part of this specification.

BACKGROUND OF THE INVENTION

1. Field of the Invention

The present invention relates to a keyswitch structure, and more particularly to an illuminated keyswitch structure.

2. Description of the Prior Art

Some illuminated keyswitch structures on the market are equipped with an exclusive light source under the base plate to emit light upward. The base plate forms an opening corresponding to the light source so that the light can pass through the base plate. Generally, in order to avoid electrostatic discharges between the base plate and the light source and protect the light source, an insulation sheet is attached onto the light source and a circuit board on which the light source is disposed. In principle, the light source protrudes from the circuit board, so that the insulation sheet as a whole is a convex structure. The convex structure will make the portion of the illuminated keyswitch structure near the light source appear uneven, which is not conducive to the assembly of the components of the illuminated keyswitch structure and the overall thin design of the illuminated keyswitch structure. Furthermore, the convex insulation sheet will enter the opening of the base plate, and even the light source will also partially enter the opening. This structural configuration will increase the chance of structural interference with the structural parts above the base plate (e.g. the supports supporting the keycap), causing the keycap to fail to move up and down smoothly, or indirectly damage the light source.

SUMMARY OF THE INVENTION

An objective of the invention is to provide an illuminated keyswitch structure, which uses a flat spacer to separate a base plate and a light-emitting part thereof. This structural configuration helps to control the size of the structure, ensure the distance for mixing light, and protect the light-emitting part, which prevents the light-emitting part from structurally interfering with other components above the bottom plate and causing damage.

In an embodiment of the present invention, an illuminated keyswitch structure comprises: a base plate, having a plurality of openings and a plurality of rib portions separating the openings; a drive circuit board, disposed under the base plate; a spacer, disposed underneath the base plate and above the drive circuit board, the spacer having a through hole; a light-emitting part, disposed on the drive circuit board and in the through hole, the light-emitting part vertically corresponding to one of the openings of the base plate; and a light-permeable covering structure, including at least one first covering layer and at least one second covering layer, wherein the first covering layer covers above the light-emitting part and overlaps with vertical projection of said one of the openings of the base plate; wherein the second covering layer vertically corresponds to the light-emitting part and said corresponding one opening of the base plate, the second covering layer blocks at least partial light of the light-emitting part toward said corresponding one opening to reduce illuminating intensity provided there through.

In another embodiment, the first covering layer covers above the drive circuit board within the through hole of the spacer.

In another embodiment, the through hole of the spacer vertically communicates with at least two of the openings of the base plate, and/or the through hole of the spacer overlaps with at least two of the rib portions of the base plate.

In another embodiment, the first covering layer overlaps with vertical projections of at least two of the openings of the base plate, and/or the first covering layer overlaps with vertical projections of at least two of the rib portions of the base plate.

In another embodiment, the spacer includes a top adhesive disposed thereon and a bottom adhesive disposed thereunder, a total thickness of the spacer, the top adhesive, and the bottom adhesive is greater than or equal to a sum of a height of the light-emitting part and a thickness of a portion of the light-permeable covering structure above the light-emitting part.

In another embodiment, the spacer includes a top adhesive disposed thereon and/or a bottom adhesive disposed thereunder, the spacer further has an annular clearance fringe located thereon or thereunder without the top adhesive or the bottom adhesive, and the annular clearance fringe surrounds the periphery of the through hole of the spacer.

In another embodiment, the second covering layer further includes an upper light-absorbing layer and a bottom reflective layer.

In another embodiment, the diameter of the upper light-absorbing layer may be smaller than that of the bottom reflective layer.

In another embodiment, the first covering layer is achieved by a flat first covering layer configured between the base plate and the spacer without entering into the through hole.

In another embodiment, the second covering layer further includes an upper light-absorbing layer disposed on top of the flat first covering layer, and further includes a bottom reflective layer on bottom of the flat first covering layer.

In another embodiment, the flat first covering layer includes an interval adhesive disposed thereon, the flat first covering layer further has an annular clearance fringe located thereon without the interval adhesive, and the annular clearance fringe surrounds the vertically-projected periphery of the through hole of the spacer.

In another embodiment, the second covering layer is reflective to reflect lights back into the first covering layer in the through hole of the spacer.

In another embodiment, the at least one second covering layer is reflective and shields between a corresponding one of the rib portions of the base plate and the first covering layer to reflect light toward said corresponding rib portion back into the first covering layer.

In another embodiment, the drive circuit board includes a plurality of reflectors disposed thereon, located vertically corresponding to at least two of the openings of the base plate.

In another embodiment, the drive circuit board includes at least one face reflector and a plurality of dot reflectors, the face reflector is disposed on top of the drive circuit board, and the dot reflectors are located on the face reflector to vertically correspond to at least two of the openings of the base plate.

In another embodiment, the illuminated keyswitch structure further comprises a keycap with at least one light-transmissive portion, wherein lights passing through the openings of the baseplate further illuminate the light-transmissive portion.

In a derived embodiment, an illuminated keyswitch structure comprises: a base plate, having a plurality of openings and a plurality of rib portions separating the openings; a drive circuit board, disposed under the base plate; a spacer, disposed underneath the base plate and above the drive circuit board, the spacer having a through hole; a light-emitting part, disposed on the drive circuit board and in the through hole, the light-emitting part vertically corresponding to one of the openings of the base plate; and a light-permeable covering structure, including a flat first covering layer, a cake first covering layer and at least one second covering layer, wherein the cake first covering layer covers above the light-emitting part and the drive circuit board within the through hole of the spacer, the cake first covering layer further overlaps with vertical projection of said one of the openings of the base plate; wherein the flat first covering layer is configured between the base plate and the spacer without entering into the through hole; wherein the second covering layer is disposed at least partially above the flat first covering layer and vertically corresponds to the light-emitting part and said corresponding one opening of the base plate, the second covering layer blocks at least partial light of the light-emitting part toward said corresponding one opening to reduce illuminating intensity provided there through.

In another derived embodiment, the drive circuit board includes a plurality of reflectors disposed thereon, located vertically corresponding to at least two of the openings of the base plate.

In another derived embodiment, the drive circuit board includes at least one face reflector and a plurality of dot reflectors, the face reflector is disposed on top of the drive circuit board, and the dot reflectors are located on the face reflector to vertically correspond to at least two of the openings of the base plate.

In another derived embodiment, wherein the second covering layer is reflective to reflect lights back into the first covering layer in the through hole of the spacer.

In another embodiment of the present invention, an illuminated keyswitch structure comprises: a base plate, having an opening; a drive circuit board, having a face reflector and at least one dot reflector disposed thereon; a spacer, adhered on the drive circuit board, the spacer having a through hole and an adhesive-less clearance fringe at least partially surrounding the through hole; a light-emitting part, disposed on the drive circuit board and proximate to the face reflector and the dot reflector; and a translucent covering structure, covering above the light-emitting part and including a reflective layer; wherein the reflective layer reflects off light from the light-emitting part toward the face reflector and/or the dot reflector so that the light reflected up from the face reflector and/or the dot reflector passes through the through hole of the spacer, and then illuminates upward through the opening of the base plate.

In yet another embodiment of the present invention, an illuminating module adapted to illuminate a keyswitch comprises: a drive circuit board, having a face reflector and at least one dot reflector disposed thereon; a spacer, adhered on the drive circuit board, the spacer having a through hole and an adhesive-less clearance fringe at least partially surrounding the through hole; a light-emitting part, disposed on the drive circuit board among the face reflector and the at least one dot reflector; and a translucent covering structure, covering above the light-emitting part and including a reflective layer; wherein the reflective layer reflects off light from the light-emitting part, and the face reflector and/or the at least one dot reflector reflect light to pass through the through hole of the spacer and then illuminate upward through the translucent covering structure.

In further another embodiment of the present invention, an illuminating module adapted to illuminate a keyswitch comprises: a drive circuit board, having a face reflector and at least one dot reflector disposed thereon; a light-emitting part, disposed on the drive circuit board and located among the face reflector and the at least one dot reflector; a translucent covering structure, covering above the light-emitting part and including a reflective layer and a flat transparent layer, the reflective layer reflecting off light of the light-emitting part; and a spacer, adhered between the flat transparent layer and the drive circuit board, the spacer having a through hole and an adhesive-less clearance fringe at least partially surrounding the through hole, so that one or both of the face reflector and the at least one dot reflector are at least partially disposed between the light-emitting part and the adhesive-less clearance fringe.

In an embodiment, the reflective layer of the translucent covering structure at least partially allows light to pass therethrough.

In an embodiment, the reflective layer of the translucent covering structure at least partially overlaps with the face reflector and/or the at least one dot reflector.

In an embodiment, the translucent covering structure further includes a flat transparent layer covering the light-emitting part without entering into the through hole.

In an embodiment, the spacer is adhered between the drive circuit board and the flat transparent layer of the translucent covering structure.

In an embodiment, the through hole of the spacer overlaps the opening of the base plate.

In an embodiment, a light-absorbing layer is disposed above the reflective layer of the translucent covering structure.

In an embodiment, the diameter of the light-absorbing layer is smaller than that of the reflective layer.

In an embodiment, one or both of the face reflector and the at least one dot reflector are at least partially disposed between the light-emitting part and the adhesive-less clearance fringe.

According to the embodiments of the present invention, for an illuminated keyswitch configured with a dedicated low-illuminance light-emitting part, the illumination uniformity for the entire keycap can be well enhanced. Furthermore, the illumination loss caused by lights towards the rib portions of base plate may be resolved by the corresponding reflective second covering layers. In addition, a larger cake-shaped first covering layer is introduced to cover the light-emitting part within through hole of spacer, which is large enough to overlap with the vertical projections of at least two of the plural openings of the base plate. Such cake-shaped first covering layer may have reflectors thereunder to reflect recycled lights towards the corner light-transmissive portions of the keycap to improve the illumination uniformity. Flat first covering layer is also introduced to be applied with or without cake-shaped first covering layer, thereby optimizing the illumination uniformity for the illuminated keyswitch with a low-illuminance light-emitting part.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
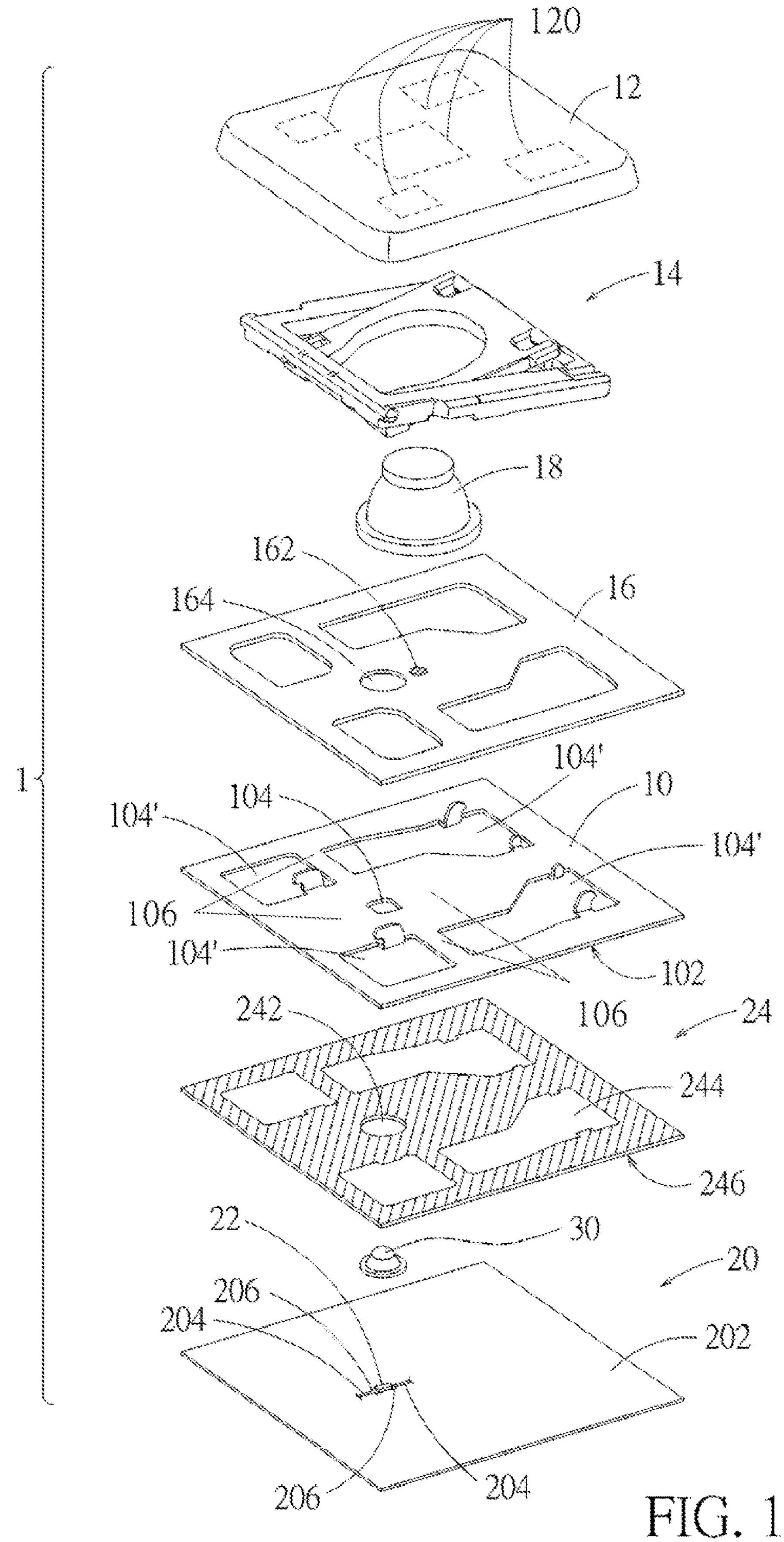
FIG. 1 is an exploded view of an illuminated keyswitch structure according to an embodiment.
Figure 2:
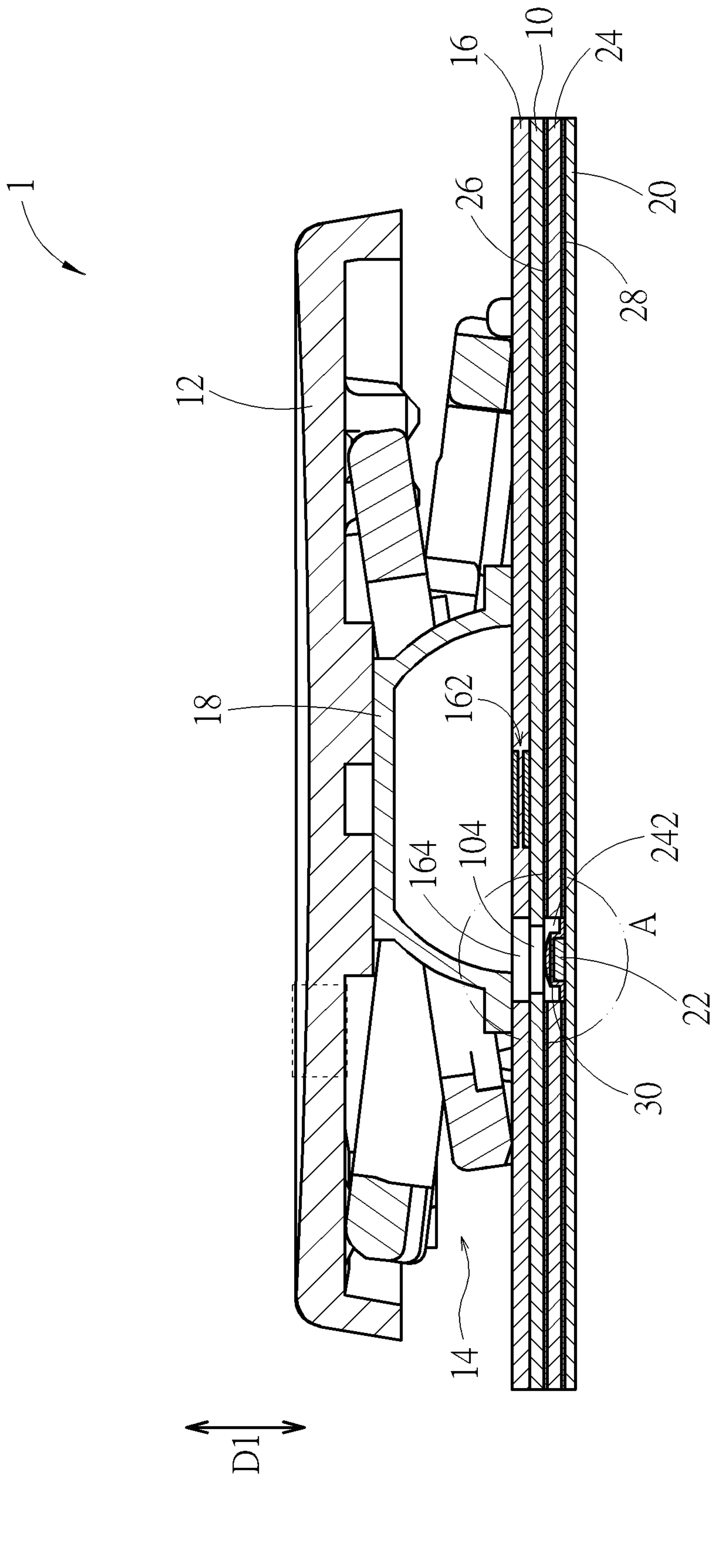
FIG. 2 is a sectional view of the illuminated keyswitch structure in FIG. 1.
Figure 3:
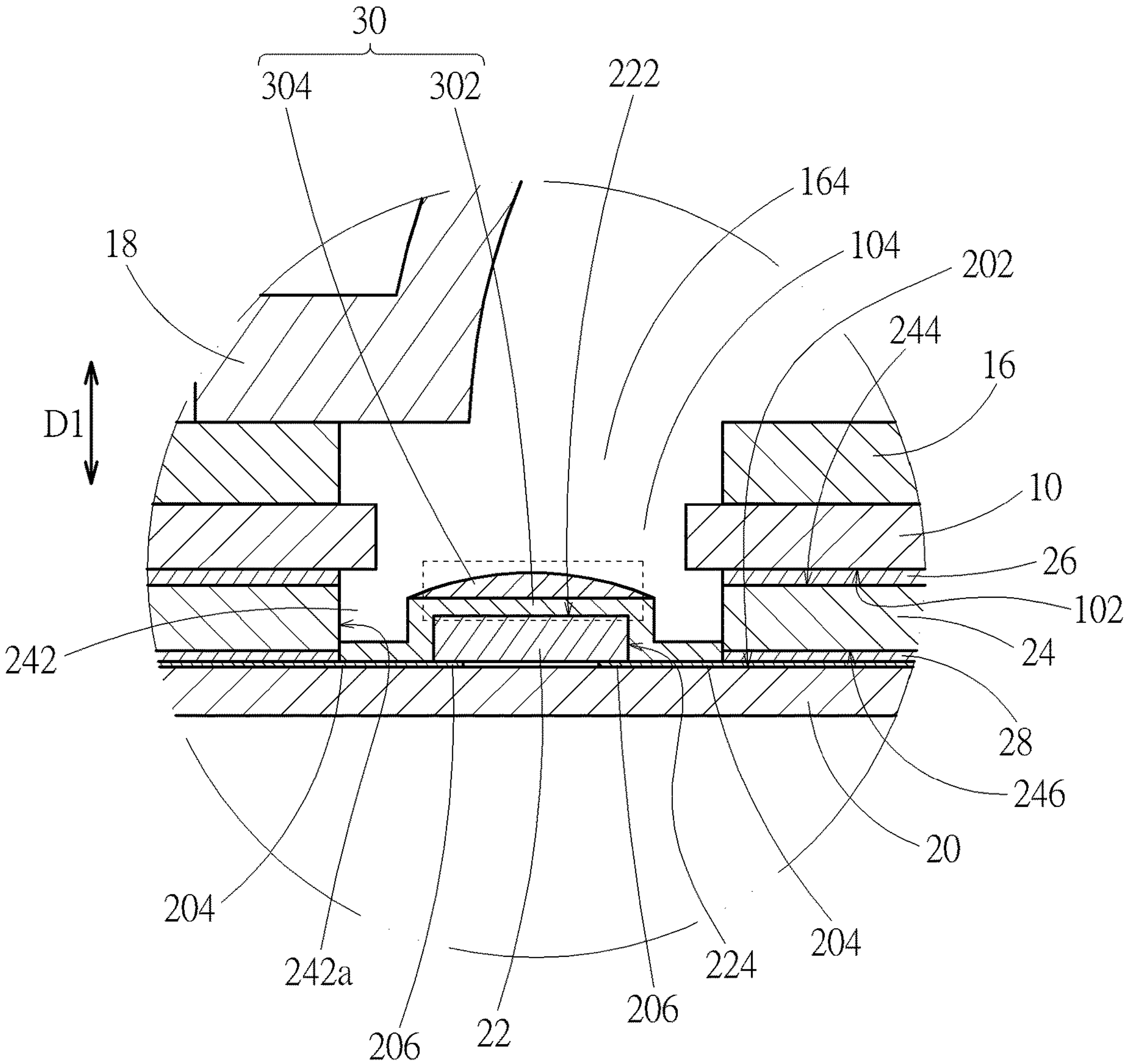
FIG. 3 is an enlarged view of the circle A in FIG. 2.

Please refer to FIG. 1 to FIG. 3. An illuminated keyswitch structure 1 according to an embodiment includes a base plate 10, a keycap 12, a lift mechanism 14, a switch circuit board 16, a resilient restoration part 18, a drive circuit board 20, a light-emitting part 22, and a spacer 24. The keycap 12 is disposed above the base plate 10. The lift mechanism 14 is connected to and between the base plate 10 and the keycap 12, so that the keycap 12 can move up and down relative to the base plate 10 through the lift mechanism 14. The switch circuit board 16 is disposed on the base plate 10 and has a switch 162 (indicated by a hatched circle in FIG. 1). The resilient restoration part 18 is disposed between the keycap 12 and the switch 162 corresponding to the switch 162. The keycap 12 can be pressed down to squeeze the resilient restoration part 18, so that the resilient restoration part 18 triggers the switch 162. The switch 162 can be triggered by a triggering protrusion located above the switch circuit board 16. The triggering protrusion extends from any of components above the switch circuit board 16, including the resilient restoration part 18, the lift mechanism 14, the keycap 12, and so on. When the keycap 12 is no longer pressed, the keycap 12 is moved upward to its original position by the resilience of the resilient restoration part 18. Therein, the lift mechanism 14 is achieved by a scissors support, which includes two supports that are individually connected to and between the base plate 10 and the keycap 12 and pivotally connected with each other. The switch circuit board 16 is achieved by a membrane circuit board, which includes an upper circuitry carry plate, a lower circuitry carry plate, and an intermediate insulation plate between the upper circuitry carry plate and the lower circuitry carry plate. The switch is formed by circuitry contacts oppositely disposed on the upper circuitry carry plate and the lower circuitry carry plate. The resilient restoration part 18 may be achieved by, for example, but not limited to rubber domes.

In practice, the lift mechanism 14, the switch circuit board 16, and the resilient restoration part 18 may be achieved by other structures capable of producing the same effect. For example, the lift mechanism 14 may be achieved by a butterfly support or other mechanisms capable of moving the keycap up and down. In practice, the lift mechanism for long keycaps (e.g. space bar, enter/return key, backspace key, shift key, and so on) may be achieved by multiple scissors supports, butterfly supports, or a combination thereof. For another example, the switch circuit board 16 may be achieved by a circuit board with a tactile switch. For another example, the switch circuit board 16 may be achieved by a printed circuit board or a flexible circuit board, on which two adjacent contacts are formed as the switch 162. The resilient restoration part 18 has a conductive portion corresponding to the two contacts and can simultaneously touch the two contacts through the conductive portion to achieve the triggering of the switch 162. For another example, the resilient restoration part 18 may be achieved by a spring or other elastic structures.

Furthermore, in the embodiment, the drive circuit board 20 is disposed under the base plate 10 and has an upper surface 202. The light-emitting part 22 is electrically disposed on the upper surface 202 of the drive circuit board 20. The light-emitting part 22 may be a single monochromatic light-emitting diode (e.g., white), or multiple light-emitting diodes of different colors (e.g., red, green, and blue). The spacer 24 is disposed between the base plate 10 and the drive circuit board 20. The base plate 10 has a bottom surface 102 and one or more openings 104 and 104'. The switch circuit board 16 has a through hole 164. The spacer 24 has a through hole 242. The opening 104 of the base plate 10, the through hole 164 of the switch circuit board 16, and the through hole 242 of the spacer 24 are communicated in a vertical direction D1 (indicated by a double-headed arrow in the figures). The projections of the above three in the vertical direction D1 can be completely aligned, or at least partially overlap. That is, the opening 104, the through hole 164, and the through hole 242 in the vertical direction D1 at least partially overlap, so that in the vertical direction D1, there is a straight channel passing through the opening 104, the through hole 164, and the through hole 242. In other instances, the switch circuit board 16 is light-transmissive except for the circuitry of the switch circuit board 16, and the through hole 164 is not absolutely necessary. The light-emitting part 22 has a top surface 222 located in the through hole 242. The top surface 222 is lower in height than the bottom surface 102 of the base plate 10. Thereby, the structure of the illuminated keyswitch structure 1 around the light-emitting part 22 can keep flat, which helps to control the size of the structure. Furthermore, in other instances, the light-emitting part 22 and the through hole 242 may be located corresponding to other openings 104' of the base plate 10. For multiple-width keys of larger size or keys that need one more indication light source, multiple light-emitting parts 22 may be located corresponding to the different openings 104 and 104' of the base plates 10 respectively.

The spacer 24 can also prevent the light-emitting part 22 form structurally entering the opening 104 of the base plate 10, which can prevent the light-emitting part 22 from structurally interfering with other components (e.g., temporarily enter the opening 104 due to the movement thereof) above the bottom plate 10 in the illuminated keyswitch structure 1 and causing damage. In addition, in the embodiment, the spacer 24 is plate-shaped and has a profile equivalent to that of the drive circuit board 20. This structural configuration helps the base plate 10, drive circuit board 20 and spacer 24 to keep flat; however, it is not limited thereto. For example, the spacer 24 is ring-shaped (e.g., circle, square, or other geometric shapes) and surrounds the light-emitting part 22, which still can make the structure of the illuminated keyswitch structure 1 around the light-emitting part 22 keep flat. In addition, in practice, the switch circuit board 16 may be disposed under the base plate 10 and structurally integrated with the drive circuit board 20 into a single circuit board. For example, with removing the switch circuit board 16, a tactile switch is disposed on the drive circuit board 20 corresponding to the triggering protrusion that extends from any of the resilient restoration part 18, the lift mechanism 14, and the keycap 12. The base plate 10 forms an opening correspondingly, so that the resilient restoration part 18 can move downward to touch the tactile switch.

In the embodiment, the sidewall **242*a* of the through hole 242 of the spacer 24 surrounds the light-emitting part 22 and is close enough to the side surfaces of the light-emitting part 22. The top edge of the sidewall 242*a* is higher than the light-emitting part 22, protecting the light-emitting part 22. Therefore, regardless of whether the light-emitting part 22 is covered by insulation material, the light-emitting part 22 can be protected from interference and collision during assembly or operation. Moreover, the sidewall 242*a* of the through hole 242 is opaque, so that light emitted by the light-emitting part 22 will not enter the spacer 24, which can avoid unintended a side leakage of light from the periphery of the keyswitch or keyboard. In practice, when the spacer 24 is made of light-transmissive materials, the sidewall 242*a* can be coated with an opaque layer. Moreover, the spacer 24 can be made directly of opaque materials, so that the entire spacer 24 is opaque. Furthermore, in the embodiment, the through hole 242 of the spacer 24 is larger than the opening 104 of the base plate 10 (e.g., in the vertical direction D1, the projection of the opening 104 is located within the projection of the through hole 242, and the light-emitting part 22 is located with the projection of the opening 104), which helps to prevent the light reflected by the through hole 242 and the sidewall 242*a* from being directly emitted from the opening 104. Moreover, the through hole 164 of the switch circuit board 16 is larger than the opening 104 of the base plate 10 (e.g., in the vertical direction D1, the projection of the opening 104 is located within the projection of the through hole 164), which helps to reduce the entry of the light emitted from the opening 104 into the switch circuit board 16 from the sidewall of the through hole 164. In other instances, as long as the two projections at least partially overlap in the vertical direction D1, and the light-emitting part 22 completely falls within the projections of the openings 104 and 104' of the base plate 10 in the vertical direction D1 and is not covered directly by the base plate 10, the sizes of the openings 104 and 104' of the base plate 10 are not necessarily smaller than the size of through hole 242 of the spacer 24**.

Furthermore, in the embodiment, the illuminated keyswitch structure 1 includes a top adhesive 26 and a bottom adhesive 28 (which are not shown in FIG. 1 for drawing simplification), through which the spacer 24 is combined with the base plate 10 and the drive circuit board 20 respectively. Therein, the spacer 24 has an upper surface 244 and a lower surface 246 opposite to the upper surface 244. The top adhesive 26 is disposed between the upper surface 244 and the bottom surface 102 of the base plate 10. The top adhesive 26 avoids all openings 104 and 104' of the base plate 10. The spacer 24 is fixedly connected to the base plate 10 through the top adhesive 26 (i.e., the top adhesive 26 adheres to the upper surface 244 and the bottom surface 102 of the base plate 10). The bottom adhesive 28 is disposed between the lower surface 246 and the upper surface 202 of the drive circuit board 20. The spacer 24 is fixedly connected to the drive circuit board 20 through the bottom adhesive 28 (i.e., the bottom adhesive 28 adheres to the lower surface 246 and the upper surface 202 of the drive circuit board 20). In addition, the top adhesive 26 and the bottom adhesive 28 may be made of opaque materials in practice, which can prevent light from entering the top adhesive 26 and the bottom adhesive 28.

In practice, the spacer 24 may first be coated with the top adhesive 26 and the bottom adhesive 28 on the upper surface 244 and the lower surface 246 respectively. Then, the spacer 24 is bonded to the drive circuit board 20 with the bottom adhesive 28; finally, the spacer 24 is bonded to the base plate 10 with the top adhesive 26. In general, the top adhesive 26 and the bottom adhesive 28 will not overflow into the through hole 242 of the spacer 24 and contact the sidewall **242*a* of the through hole 242 or the light-emitting part 22. In the embodiment, the coverage of the top adhesive 26 on the upper surface 244 is shown as the hatched area in FIG. 1, and is equivalent to the projection area of the base plate 10 on the upper surface 244. After the bonding, the top adhesive 26 will not be exposed; that is, the base plate 10 and the spacer 24 can completely cover the top adhesive 26. Moreover, in the vertical direction D1, the projection of the lower surface 246 of the spacer 24 is completely within the upper surface 202 of the drive circuit board 20, so the entire lower surface 246 of the spacer 24 corresponding to the area other than the light-emitting part 22, or the entire lower surface 246 of the spacer 24 except for the through hole 242 is coated with the bottom adhesive 28. Similarly, after the bonding, the bottom adhesive 28 will not be exposed; that is, the drive circuit board 20 and the spacer 24 can completely cover the bottom adhesive 28. However, it is not limited thereto in practice. Furthermore, in an instance shown by FIG. 4, the top adhesive 26' (of which the thickness is exaggeratedly shown in the figures) coats the upper surface 244 of spacer 24 in a grid. Therein, after the bonding, the top adhesive 26' is still completely covered by the base plate 10. In practice, the pattern of the grid is not limited to that shown in FIG. 4. The grid coating can increase the tolerance for the coating of the top adhesive 26', which can prevent the top adhesive 26' from overflowing from between the spacer 24** and the base plate 10 and interfering with the movement (e.g., touching the supports of the lift mechanism 14) or assembly (e.g., touching an outer casing (not shown in the figures) of the illuminated keyswitch structure 1) of other components.

Figure 4:
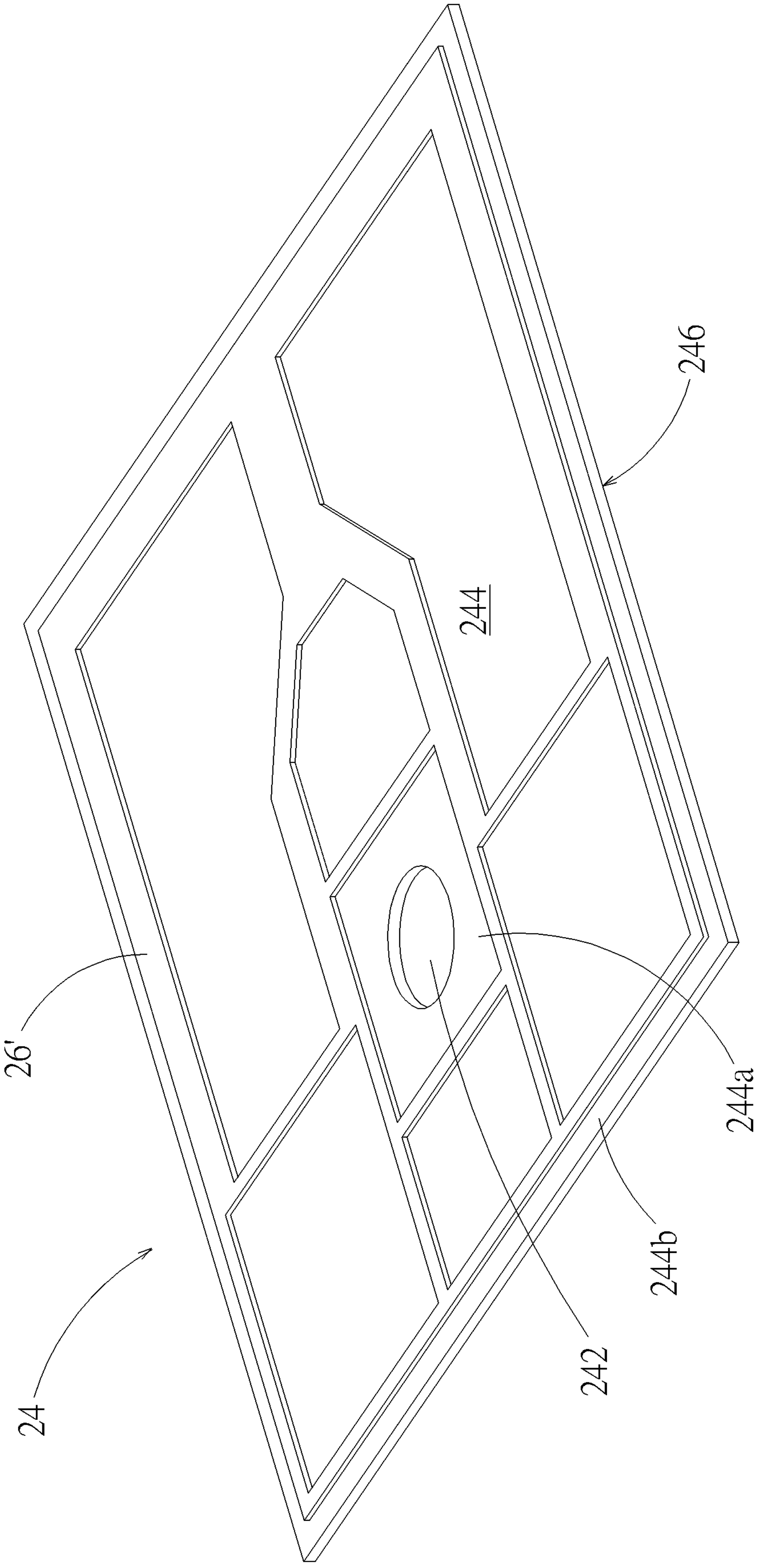
FIG. 4 is a schematic diagram illustrating the coverage of a top adhesive on the spacer in an instance.
Figure 5:
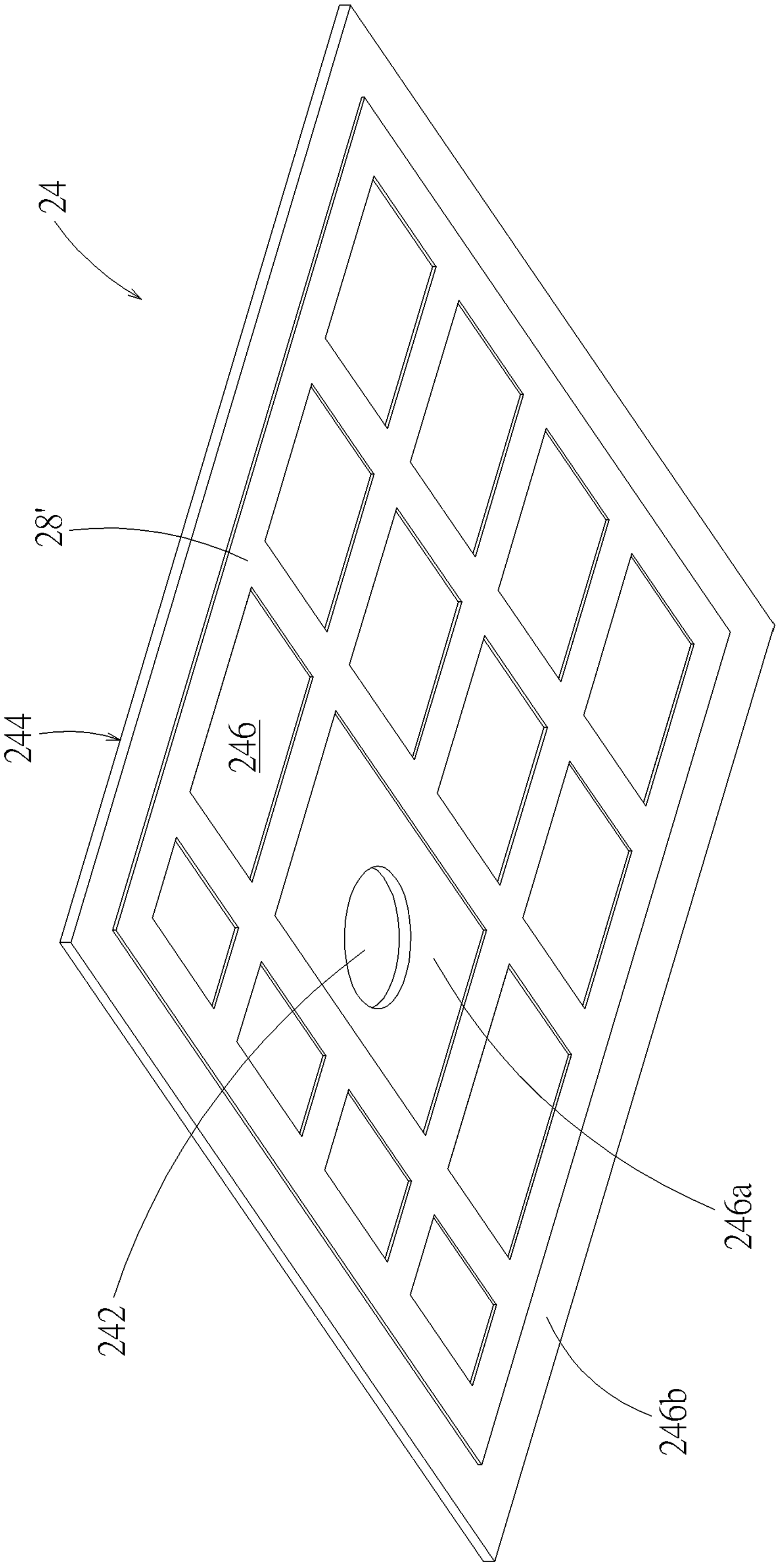
FIG. 5 is a schematic diagram illustrating the coverage of a bottom adhesive on the spacer in an instance.

Furthermore, as shown by FIG. 4, the upper surface 244 has an annular clearance fringe 244*a*, surrounding the periphery of the through hole 242. There is no top adhesive 26' on the annular clearance fringe 244*a* (i.e., adhesive-less clearance fringe), which can prevent the top adhesive 26' from overflowing from between the spacer 24 and the base plate 10 and entering the through hole 242 of the spacer 24 or the opening 104 of the base plate 10. Moreover, the upper surface 244 has an outer clearance fringe 244*b*. There is no top adhesive 26' on the outer clearance fringe 244*b*, which can prevent the top adhesive 26' from overflowing outward from between the spacer 24 and the base plate 10. Similarly, in an instance shown by FIG. 5, the bottom adhesive 28' (of which the thickness is exaggeratedly shown in the figures) is coated on the lower surface 246 of spacer 24 in a grid. The lower surface 246 has an annular clearance fringe 246*a* and an outer clearance fringe 246*b*. The annular clearance fringe 246*a* surrounds the periphery of the through hole 242. There is no bottom adhesive 28' on the annular clearance fringe 246*a* and also on the outer clearance fringe 246*b*. The grid coating of the bottom adhesive 28' also has the same effect as the grid coating of the top adhesive 26' and will not be repeated herein. In addition, in practice, the top adhesive and the bottom adhesive can also coat on the upper surface 244 and the lower surface 246 of the spacer 24 in discrete dots, which also can bond the space 24 to the base plate 10 and the drive circuit board 20. Furthermore, for the thinning trend of illuminated keyswitch structures, the distance between the light-emitting part 22 and the keycap 12 is designed to be gradually reduced. When the light-emitting part 22 is a combination of multiple light-emitting diodes of different colors, for white light or a specific color light, since the distance between the light-emitting part 22 and the keycap 12 becomes smaller, the light mixing distance may be insufficient. Therefore, adjusting the thickness of the spacer 24 or the total thickness of the spacer 24, the top adhesive 26(26'), and the bottom adhesive 28(28') helps to adjust the light mixing distance, so that light of various colors emitted by the light-emitting part 22 can have enough distance to mix to be a required target color light before passing through the keycap 12. For the protection effect on the light-emitting part 22, the total thickness of the spacer 24, the top adhesive 26(26'), and the bottom adhesive 28(28') (calculated from the top surface of the drive circuit board 20, the same below), or the sum of the height of the sidewall 242*a* of the through hole 242 and the thicknesses of the top adhesive 26(26') and the bottom adhesive 28(28') is required to be greater than or equal to the height of the light-emitting part 22.

Please refer back to FIG. 1 to FIG. 3. In the embodiment, the illuminated keyswitch structure 1 also includes a light-permeable covering structure 30 that covers the light-emitting part 22. The light-emitting part 22 may be but not limited to a light-emitting diode. The light-emitting part 22 emits light form the top surface 222 (i.e. emitting light upward). The light-emitting part 22 has a side surface 224 (i.e. the sidewall surface that is adjacent to the top surface 222 and surrounds the light-emitting part 22). The light-permeable covering structure 30 covers the top surface 222 and the side surface 224 of the light-emitting part 22 and the upper surface 202 of the drive circuit board 20 at the same time, so that has the effects of modulating the light emitted by the light-emitting part 22 and fixing the light-emitting part 22 on the drive circuit board 20 at the same time. Therein, the structure of the light-permeable covering structure 30 above the top surface 222 can be regarded as a light modulation portion (indicated by a dashed frame in FIG. 3), for modulating the light emitted by the light-emitting part 22. The light modulation portion has an upward convex part, which has a light-converging effect; however, it is not limited thereto. In the embodiment, connection pads 206 of the circuitry 204 of the of the drive circuit board 20 are exposed from the through hole 242 of the spacer 24. The light-emitting part 22 is electrically connected to the connection pads 206. The light-permeable covering structure 30 covers the connection pad 206 and the portion of the circuitry 204 exposed from the through hole 242 at the same time, so that the light-permeable covering structure 30 also has an electrostatic discharge protection effect.

Furthermore, in the embodiment, the highest point of the light-permeable covering structure 30 is substantially equal to the bottom surface 102 of the base plate 10, which prevents the light-permeable covering structure 30 from structurally interfering with other components above the bottom plate 10 in the illuminated keyswitch structure 1. The light-permeable covering structure 30 may be designed to be lower than the bottom surface 102. Furthermore, in practice, the light-permeable covering structure 30 may be obtained by dropping glue (e.g. after the spacer 24 is fixed on the drive circuit board 20) or other methods (e.g. by assembling an additional component to the light-emitting part 22). In addition, in practice, the illuminated keyswitch structure 1 can be provided without the light-permeable covering structure 30 covering the light-emitting part 22. In this instance, the top surface 222 of the light-emitting part 22 may be equal to the bottom surface 102 of the base plate 10 in height.

In the embodiment, the light-permeable covering structure 30 includes a first covering layer 302 and a second covering layer 304. The first covering layer 302 is disposed above the top surface 222. The second covering layer 304 is disposed above the first covering layer 302. Therein, the first covering layer 302 covers the top surface 222 and side surface 224 of the light-emitting part 22 and the connection pads 206 at the same time. The second covering layer 304 is disposed on the first covering layer 302 opposite to the top surface 222; however, it is not limited thereto in practice. For example, the second covering layer 304 covers the entire first covering layer 302. Furthermore, in practice, the first covering layer 302 or the second covering layer 304 may be an optical wavelength conversion layer, e.g., but not limited to including phosphors, quantum dots. In addition, the light-permeable covering structure 30 may be a single-layer structure or a multi-layer structure in practice.

Figure 6:
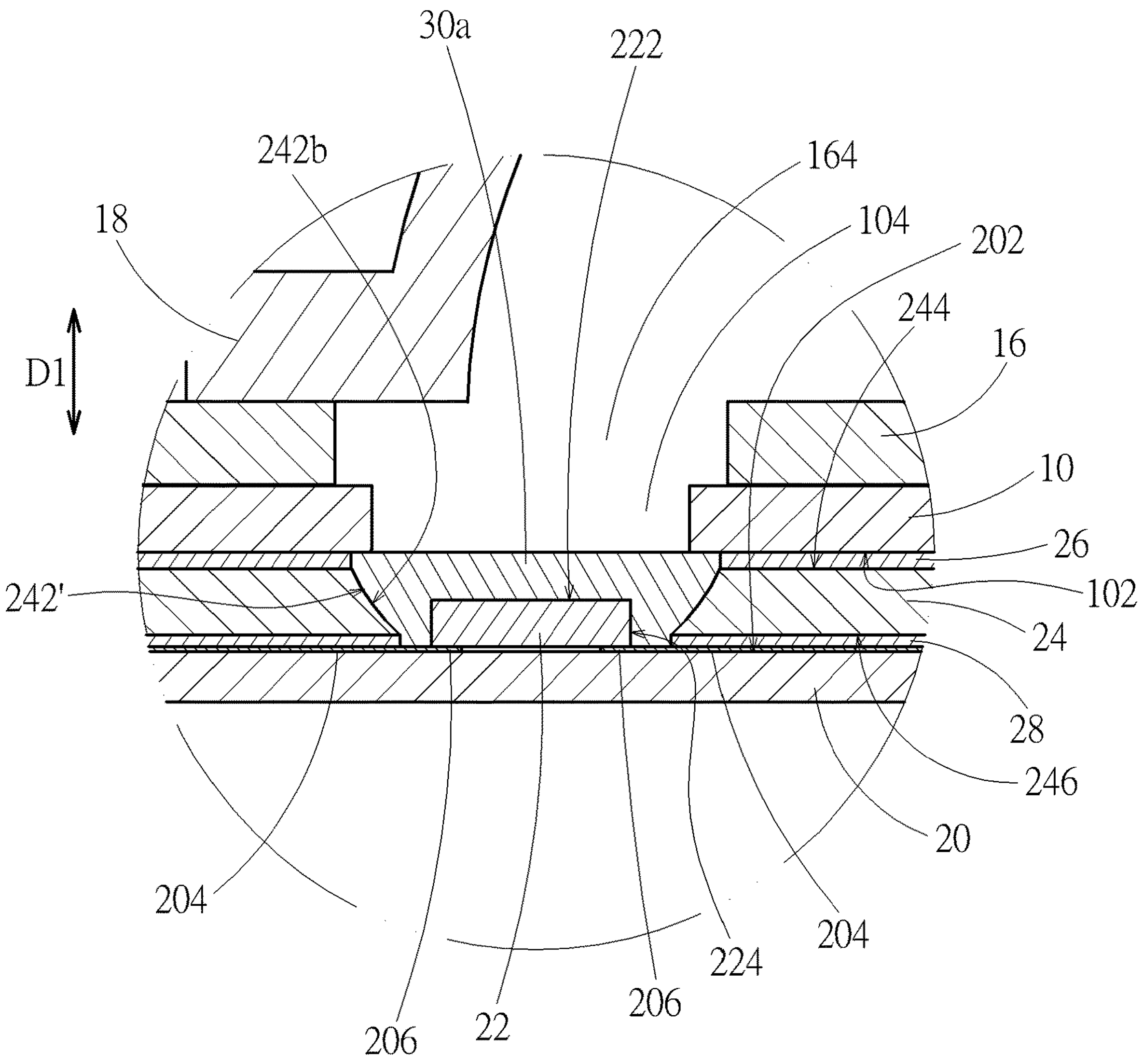
FIG. 6 is a sectional view of the through hole of the spacer in an instance.
Figure 7:
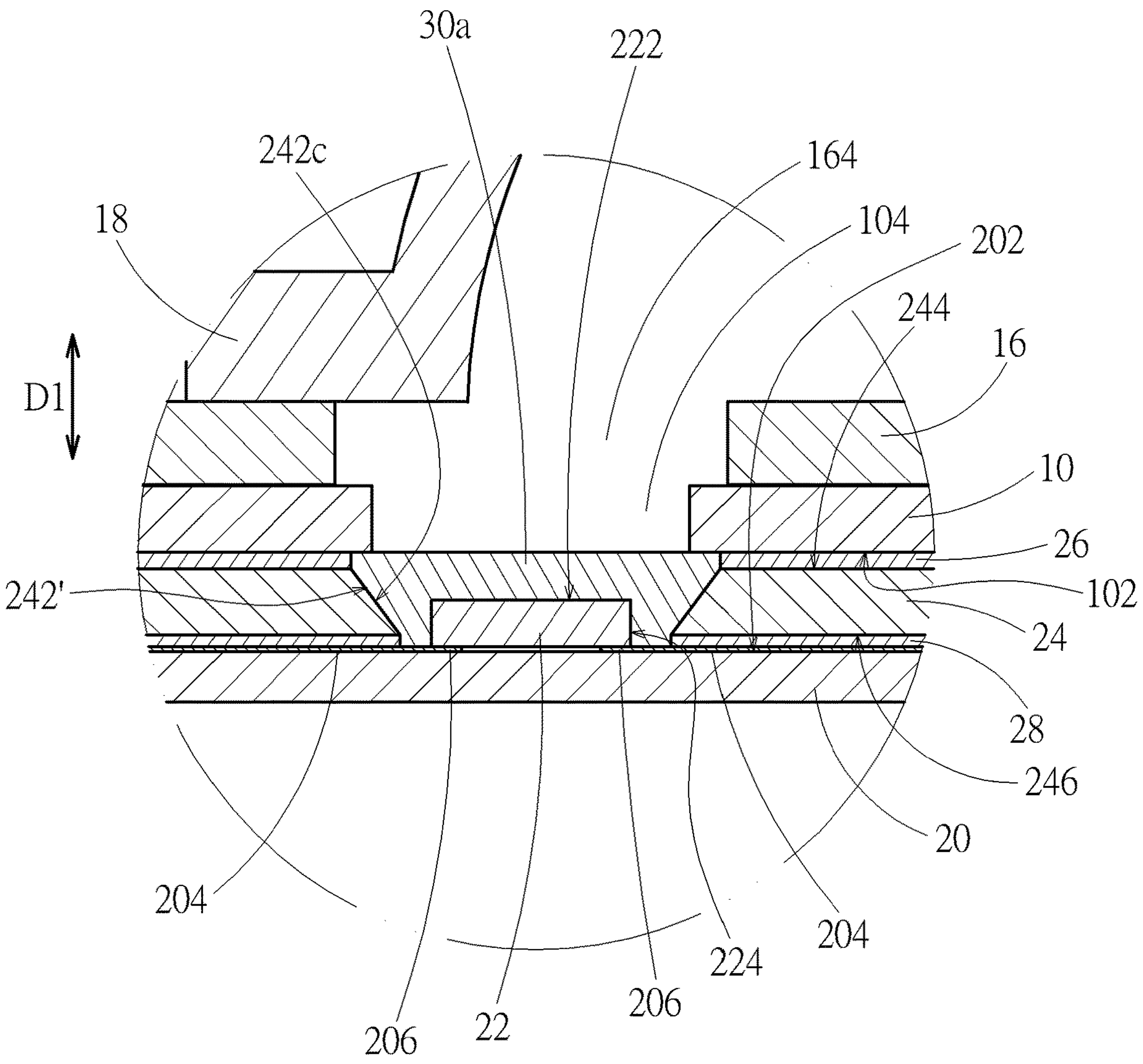
FIG. 7 is a sectional view of the through hole of the spacer in another instance.
Figure 8:
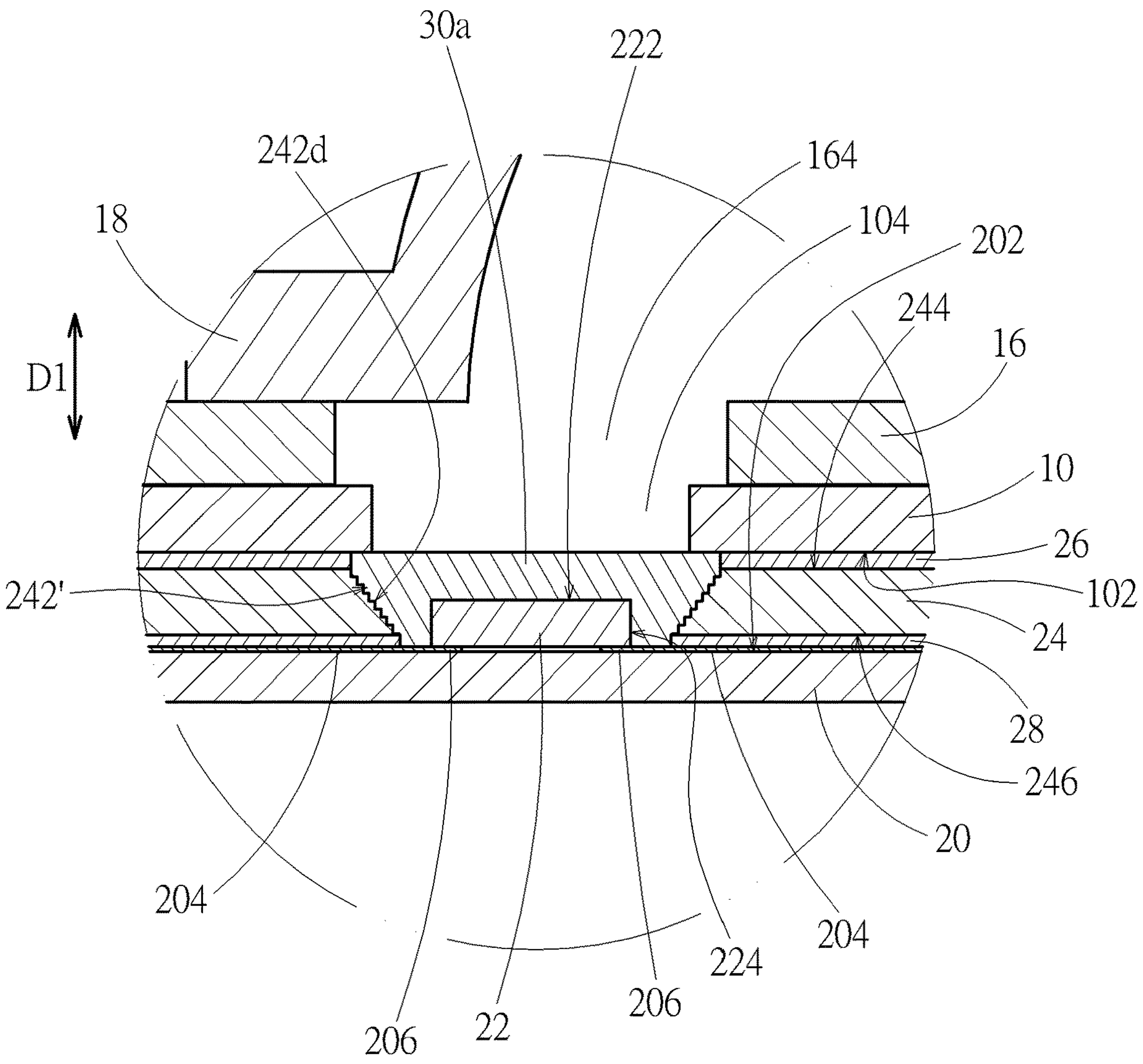
FIG. 8 is a sectional view of the through hole of the spacer in another instance.
Figure 9:
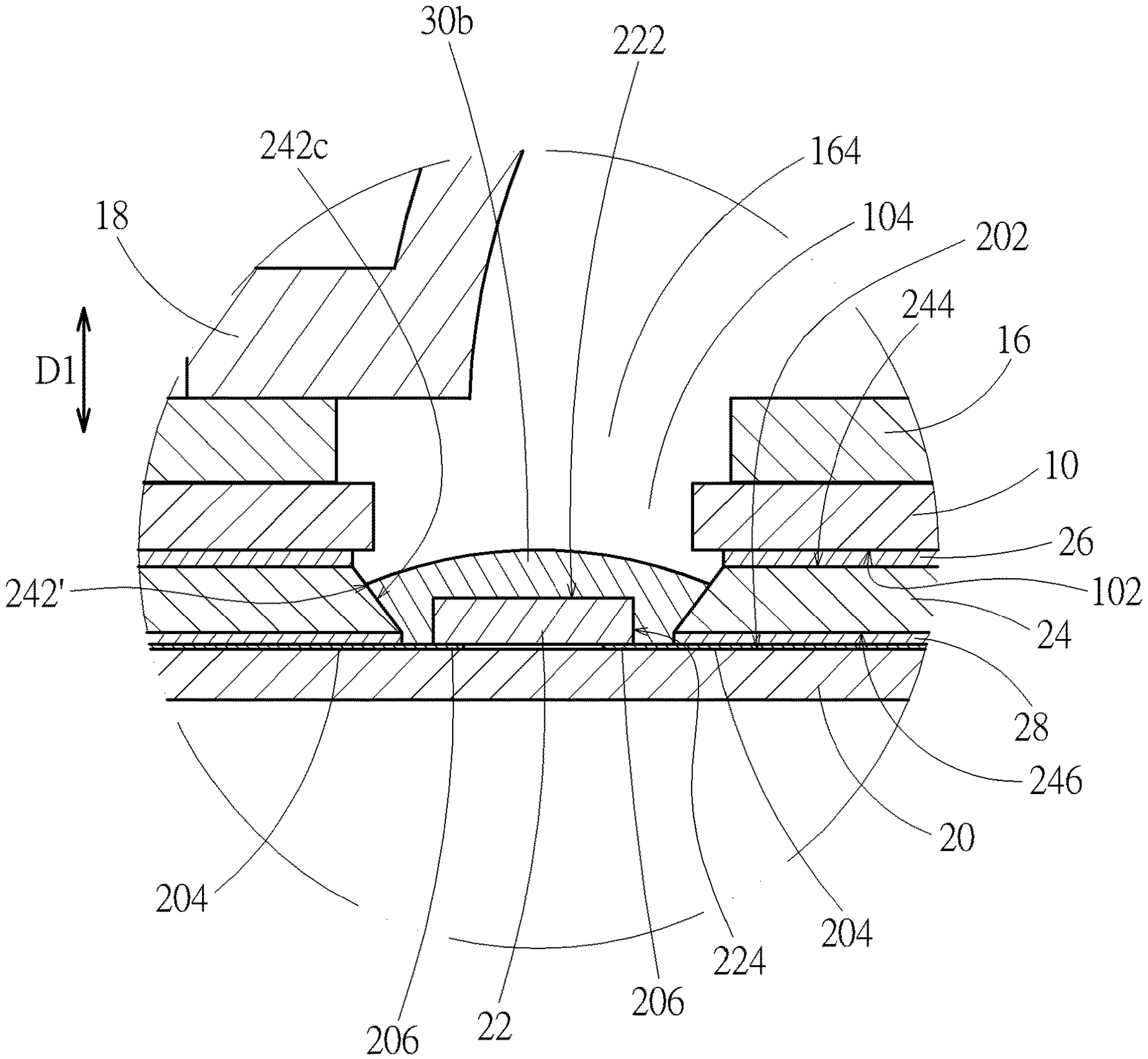
FIG. 9 is a sectional view of the light-permeable covering structure in the through hole of the spacer in an instance.
Figure 10:
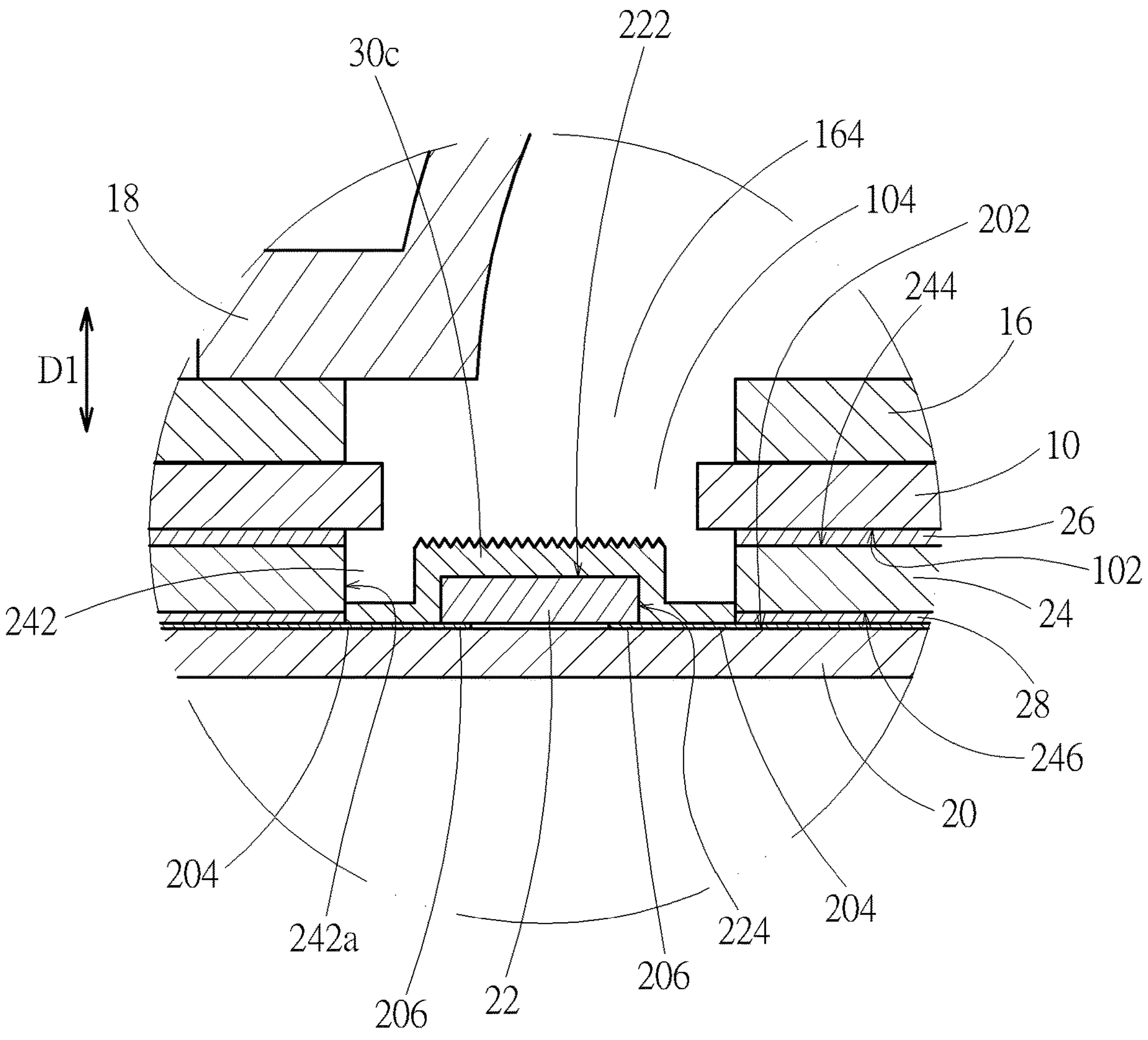
FIG. 10 is a sectional view of the light-permeable covering structure in the through hole of the spacer in another instance.

Furthermore, in the embodiment, the light-permeable covering structure 30 does not completely fill up the through hole 242, and there is a gap formed between the light-permeable covering structure 30 and the sidewall 242*a* of the through hole 242. As shown by FIG. 3, an air separation wall is formed between the light-permeable covering structure 30 and the sidewall 242*a* of the through hole 242 and surrounds the side surface 224; however, it is not limited thereto. For example, in an instance shown by FIG. 6, the sidewall 242*b* of the through hole 242' can reflect light and is a cup-shaped structure with an opening facing upward (i.e., toward the opening 104 of the base plate 10), which helps to direct the light emitted by the light-emitting part 22 to travel upward. In the embodiment, the sidewall 242*b* as a whole is a concave surface. However, it is not limited thereto in practice. For example, the sidewall 242c is a tapered surface (as shown by FIG. 7). For another example, the sidewall 242d is a stepped surface (as shown by FIG. 8). For another example, the sidewall may be other structures capable of directing light upward. The above concave surface, tapered surface, and stepped surface may be formed by hot pressing in practice. Furthermore, as shown by FIG. 6, the light-permeable covering structure 30a fills up the through hole 242' and is substantially coplanar with the bottom surface 102 of the base plate 10; however, it is not limited thereto in practice. For example, the light-permeable covering structure 30b has an upward protrusion (as shown by FIG. 9). For another example, the surface of the light-permeable covering structure 30c is provided with a micro structure formed thereon (e.g. a serrated structure, as shown by FIG. 10). Similarly, the above light-permeable covering structure 30a and light-permeable covering structure 30b may be a multi-layer structure in practice, which will not be repeated. In practice, the contours of the light-permeable covering structure 30a and light-permeable covering structure 30b may be formed by hot pressing. For the protection effect on the light-emitting part 22, the total thickness of the spacer 24, the top adhesive 26(26'), and the bottom adhesive 28(28'), or the sum of the height of the sidewall 242a of the through hole 242 and the thicknesses of the top adhesive 26(26') and the bottom adhesive 28(28') is required to be greater than or equal to the sum of the height of the light-emitting part 22 and the thickness of the portion of the light-permeable covering structure 30 (or the light-permeable covering structures 30a and 30b) above the light-emitting part 22.

In addition, as shown by FIG. 1 to FIG. 3, in the illuminated keyswitch structure 1, the resilient restoration part 18 is light-transmissive, so that even if the light-emitting part 22 is under the resilient restoration part 18, the light emitted by the light-emitting part 22 still can travel toward the keycap 12 to provide back light required for a light-transmissive portion 120 of the keycap 12 (indicated by a dashed frame in FIG. 1 and FIG. 2; e.g. numbers, symbols, letters, text, graphics or a combination thereof). Furthermore, in the embodiment, the light-emitting part 22 emits light from the top surface 222; however, it is not limited thereto in practice. For example, the light-emitting part 22 may be side-emitting and still can effectively guide the light emitted by the light-emitting part 22 to travel toward the keycap 12 in coordination with a cup-shaped through hole sidewall (e.g. the sidewalls 242b~d).

Referring to FIG. 1, for a single, thin illuminated keyswitch 1 with a dedicated light-emitting part 22 configured very close to the keycap 12, the light-emitting part 22 only needs low-illuminance to illuminate the keycap 12. However, the power consumption is successfully reduced, yet the illumination uniformity for the entire keycap 12 might become an emerging issue. For example, the inner light-transmissive portion 120 of the keycap 12 might have the brightest intensity, while the four corner light-transmissive portions 120 could be much darker.

Figure 11:
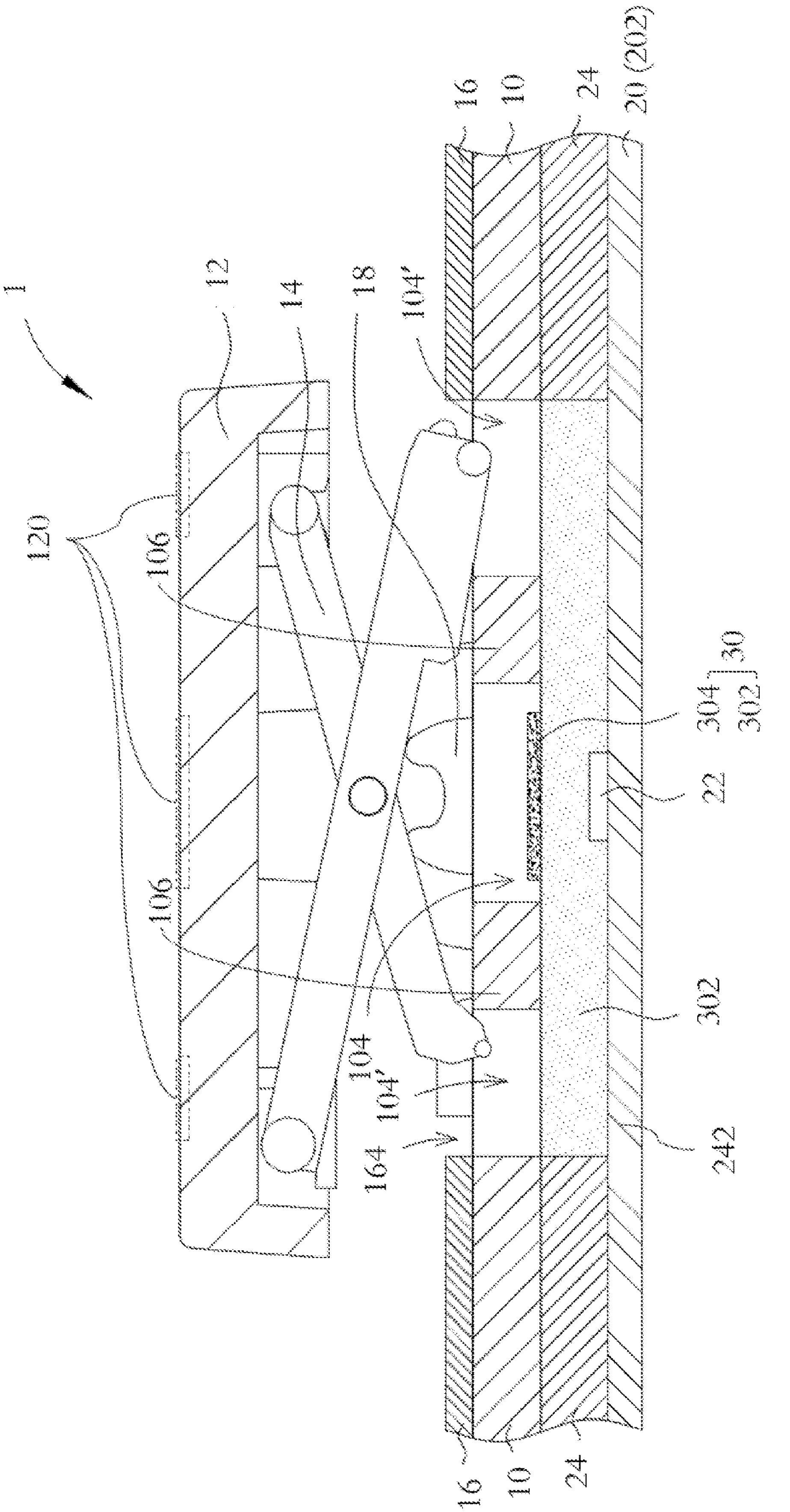
FIG. 11 is a sectional view of an illuminated keyswitch structure in a variant embodiment.

Refer to FIG. 11, which is a sectional view of the illuminated keyswitch structure in a variant embodiment. The light-emitting part 22 in FIG. 11 with low luminance is disposed within a single large through hole 242 of spacer 24. The light-emitting part 22 vertically corresponds to one of the openings 104 or 104' of the base plate 10. The size of the single through hole 242 may overlaps most of the projection area of the keycap 12. The size of the single through hole 242 is large enough to communicate with at least two or more of the four corner openings 104' and the inner opening 104 of the base plate 10 in FIG. 1. In other words, the large through hole 242 overlaps with the vertical projections of the plural rib portions 106 of the base plate 10. Alternatively, the single through hole 242 at least partially overlaps with at least one of the four corner openings 104' and also at least partially overlaps with the inner opening 104 of the base plate 10. Certainly, the single through hole 242 at least partially overlaps with one of more rib portions 106 of the base plate 10. Likewise, the light-permeable covering structure 30 includes a first covering layer 302 and a second covering layer 304. Both first and second covering layers 302/304 may be light-permeable. Alternatively, the first covering layer 302 is light-permeable, while the second covering layers may be at least partially light-permeable, with parts of light absorbed or reflected. The cake-shaped first covering layer 302 is not only disposed above the top surface 222 of light-emitting part 22, but also covers at least the most of the through hole 242 and the top surface of the drive circuit board 20 within through hole 242, such that the first covering layer 302 at least partially overlaps with each of vertical projections of the four corner openings 104' and the inner opening 104 of the base plate 10. The second covering layer 304 is disposed above the first covering layer 302 and corresponds to the light-emitting part 22, at least partially overlaps with the vertical projection of the inner opening 104. In other words, the second covering layer 304 is disposed between and vertically corresponds to the light-emitting part 22 and the said one of the openings 104 or 104' of the base plate 10. The second covering layer 304 has a diameter larger than the light-emitting part 22, and may also has a diameter smaller than the inner opening 104 to allow light to pass through the gap between the ribs 106 of the base plate 10 and the second covering layer 304. The second covering layer 304 may have the same diameter as the inner opening 104 in a variant embodiment. The first covering layer 302 and the second covering layer 304 may both be at least partially light-permeable to allow light of the light-emitting part 22 to pass therethrough. The first covering layer 302 may be made of highly light-permeable, curable gel material to allow light to transmit within the first covering layer 302 itself. Under certain conditions (e.g. curing the first covering layer 302 to achieve smooth, hard and flat surfaces), part of the light may achieve total internal reflection inside the first covering layer 302 and allow light to travel laterally there-within, so that the light passes the inner opening 104 of the base plate may be reduced, and the majority of light of the light-emitting part 22 may be diffused widely to the vertical projections of all the four corner openings 104' and the inner opening 104 of the base plate 10. Accordingly, the light passes the four corner light-transmissive portions 120 of the keycap 12 may be sufficient to have similar illuminance intensity as the inner light-transmissive portion 120, thereby achieve the illumination uniformity for all the light-transmissive portions 120 on the keycap 12.

Figure 12A:
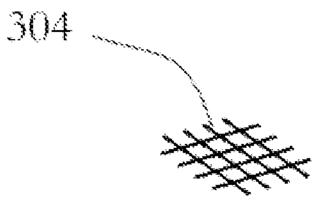
FIG. 12A, FIG. 12B and FIG. 12C are respectively an example pattern of the second covering layer according to certain variant embodiments.
Figure 12B:
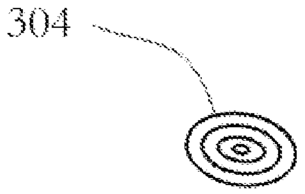
Figure 12C:
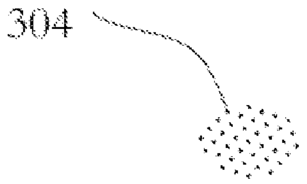

The second covering layer 304 may be realized by a plastic sheet or an ink coating, disposed on the first covering layer 302 and aligned with the light-emitting part 22. Refer to FIG. 12A, FIG. 12B and FIG. 12C, each of which is an example pattern of the second covering layer 304 according to certain variant embodiments. Various light-permeable pattern designs may be applied to determine the light-permeable effect of the second covering layer 304. In FIG. 12A, the second covering layer 304 is a pattern with two or more parallel line sets aligned across each other. In FIG. 12B, the second covering layer 304 are made of concentric circles or eclipses. The width and density of the lines and line sets are adjustable to modify the light-permeable rate of the second covering layer 304. Alternatively, in FIG. 12C, the second covering layer 304 are a pattern integrated by multiple dots, in which the shape and size of each dots and the intervals between dots may also be useful to adjust the light-permeable rate of the second covering layer 304. No matter the light-permeable rate, reflection rate and absorption rate of the second covering layer 304 are, the second covering layer 304 at least partially blocks (reflects or absorbs) lights from the light-emitting part 22 toward the corresponding above opening 104 of the base plate 10, thereby reducing the illuminating intensity of the corresponding light-transmissive portion 120 of the keycap 12.

Refer back to FIG. 11. The light-permeable covering structure 30 may be configured to partially enter into the opening 104 of the base plate 10, and partially remain underneath bottom surface 102 of the base plate 10. The top adhesive 26(26') and the bottom adhesive 28(28') shown in FIGS. 4/5 (omitted in FIG. 11) may be respectively applicable onto the top and bottom of the spacer 24 of FIG. 11. Therefore, a total thickness of the spacer 24, the top adhesive 26(26'), and the bottom adhesive 28(28') is greater than or equal to a sum of a height of the light-emitting part 22 and a thickness of the first covering layer 302 of the light-permeable covering structure 30 above the light-emitting part 22. Although in FIG. 11, the second cover layer 304 is higher than the bottom surface of the base plate 10 and enters into the opening 104, it is still possible to lower the second cover layer 304 and the entire light-permeable covering structure 30 to remain the same height as or stay underneath the bottom surface of the base plate 10 by reducing thickness of the light-permeable covering structure 30, or increase at least one of the thickness of the spacer 24, the top adhesive 26(26'), and the bottom adhesive 28(28'). In such case, a total thickness of the spacer 24, the top adhesive 26(26'), and the bottom adhesive 28(28') is greater than or equal to a sum of a height of the light-emitting part 22 and a thickness of the light-permeable covering structure 30 above the light-emitting part 22.

Figure 13:
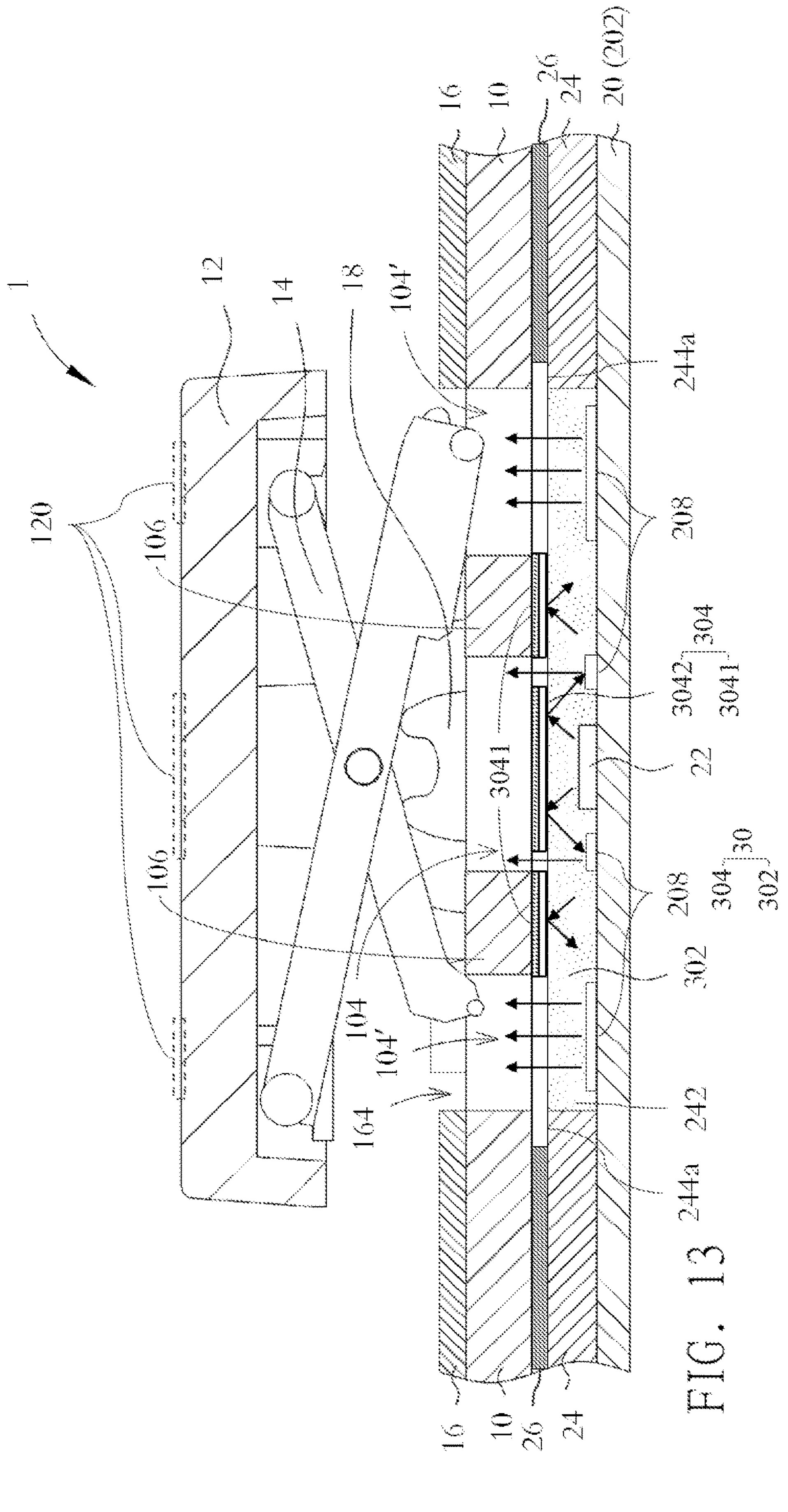
FIG. 13 is a sectional view of an illuminated keyswitch structure according to another variant embodiment.

Refer to FIG. 13, which is a sectional view of an illuminated keyswitch structure 1 according to another variant embodiment. The second covering layers 304 may include a reflective layer to reflect lights back to the first covering layer. Selectively, the second covering layers 304 may include two coating layers, with an upper light-absorbing layer 3041 and a bottom reflective layer 3042. If necessary, the diameter of the upper light-absorbing layer 3041 may be smaller than that of the bottom reflective layer 3042 to allow a ratio of non-reflected light to pass there through. The reflective second covering layer 304 better reflects light back to the first covering layer 302 for reuse of illuminating all the inner and corner light-transmissive portions 120. Referring to both FIG. 4 and FIG. 13, the upper surface 244 of the spacer 24 may has an annular clearance fringe **244*a*, surrounding the periphery of the through hole 242 of the spacer 24. There is no top adhesive 26' is on the annular clearance fringe 244*a*, which can prevent the top adhesive 26' from overflowing and entering the through hole 242 of the spacer 24 or the opening 104 of the base plate 10. Likewise, referring to both FIG. 5 and FIG. 13, the lower surface 246 of the spacer 24 may has an annular clearance fringe 246*a* (omitted in FIG. 13) surrounding the periphery of the through hole 242 of the spacer 24. There is no bottom adhesive 28' on the annular clearance fringe 246*a* to avoid the bottom adhesive 28' to enter into the through 242**.

In FIG. 1 and FIG. 13, the base plate 10 includes rib portions 106 respectively separate the four corner openings 104' and the inner opening 104. In some cases we found rib portions 106 actually block lights. The rib portions 106 do not efficiently reflect lights downward as metal materials should be for lights to have a second chance reflecting back into the interior of the illuminated keyswitch 1, and then cause illuminance loss. Therefore, the rib portions 106 of the base plate 10 are not contributable to the illumination unity for the entire keycap 12, and further adjustments need to be made. In FIG. 13, three second covering layers 304 are shown. It helps if the first covering layer 302 overlaps with vertical projections of at least two openings 104 or 104', and overlaps with vertical projections of at least two rib portions 106 as well. Each of the two lateral second covering layers 304 not only respectively covers above a portion of the first covering layer 302, but also shields between a corresponding rib portion 106 of the base plate 10 and the first covering layer 302. Likewise, the two lateral second covering layers 304 may be reflective to respectively reflect lights back to the first covering layer. Therefore, the lights towards the rib portions 106 may be reflected and recycled back to the first covering layer 302 for further reuse. Furthermore, in another derived example, the second covering layers 304 under the rib portions of the base plate 10 may be achieved by coating on the bottom surfaces of the second covering layers 304, without directly coating on the top surface of the first covering layer 302.

Referring to FIG. 13, reuse of lights is important for a low-illuminance light-emitting part 22. To better reuse the lights reflected from the second covering layer 304 to the first covering layer 302, the drive circuit board 20 includes plural reflectors 208 disposed on the top surface of the drive circuit board 20 and located corresponding to the inner opening 104 and the corner openings 104' of the base plate 10. These reflectors 208 are covered by the first covering layer 302, namely located under the first covering layer 302. Thus, lights illuminating the corner light-transmissive portions 120 of the keycap 12 will be increased to enhance the illumination uniformity for the entire keycap 12. In another embodiment, all the plural reflectors 208 in FIG. 13 may be integrated as one piece for better performance of lateral light transmittance. Alternatively, aside from plural reflectors 208 in FIG. 13, an additional larger bottom reflector 208 may surround the light-emitting part 22 and cover the top surface of the drive circuit board 20 within the through hole 242 with all the smaller reflectors 208 disposed on the larger bottom reflector 208.

Figure 14:
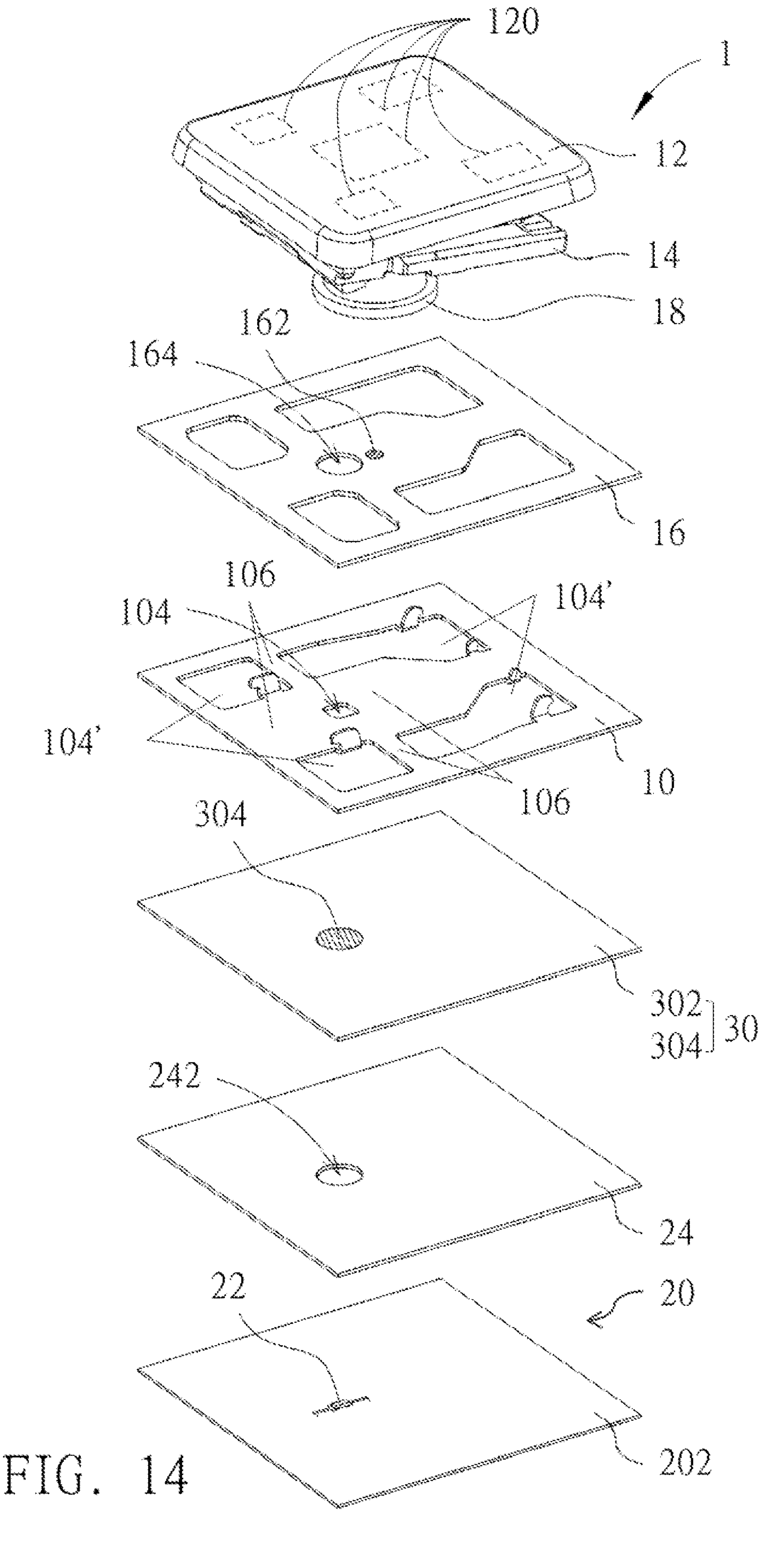
FIG. 14 is an exploded view of an illuminated keyswitch structure according to another variant embodiment.
Figure 15:
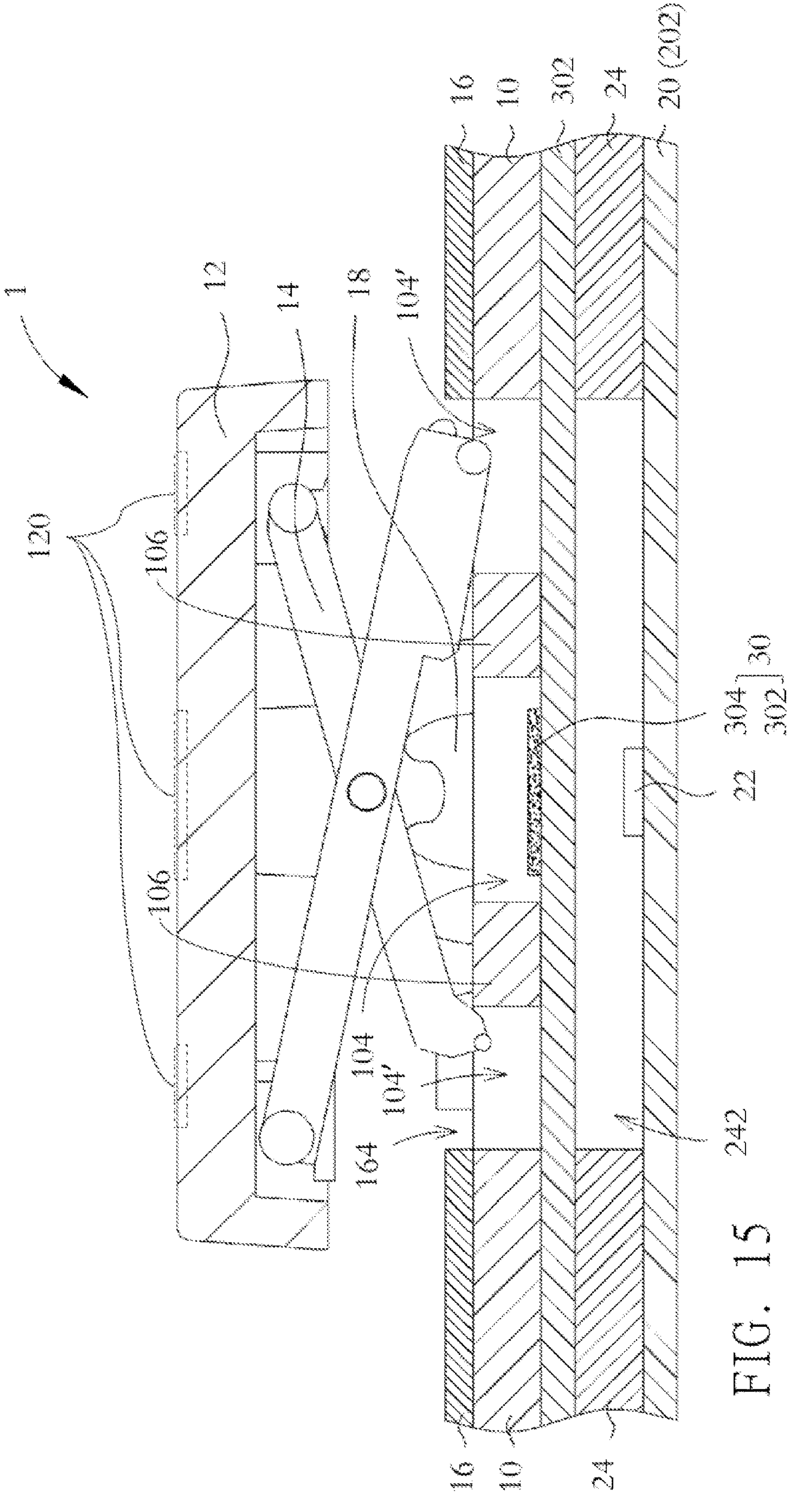
FIG. 15 is a sectional view of the illuminated keyswitch structure in FIG. 14.

Refer to FIG. 14 and FIG. 15, which is respectively an exploded view and a sectional view of an illuminated keyswitch structure 1 according to another variant embodiment. One of the major differences in FIGS. 14-15 and previous embodiments is that the through hole 242 is mostly air and not full of certain material. Here the light-permeable covering structure 30 includes a flat first covering layer 302 and a second covering layer 304 disposed on the flat first covering layer 302. The flat first covering layer 302 is configured between the base plate 10 and the spacer 24. Namely, the flat first covering layer 302 covers above the through hole 242 of the spacer 24 and covers above the light-emitting part 22 in the through hole 242. The flat first covering layer 302 does not enter into the through hole 242, it also overlaps with at least two of the openings 104 and 104' of the base plate 10. The flat first covering layer 302 may still be made of light-permeable materials, while the second covering layer 304 at least partially blocks lights to reduce the illuminating intensity of a corresponding one of the light-transmissive portions 120 on the keycap 12. The two layered second covering layer 304 in FIG. 13 are also applicable in FIG. 15. Here both the upper light-absorbing layer and the bottom reflective layer may be disposed on the flat first covering layer 302. Alternatively, only the upper light-absorbing layer is disposed on the flat first covering layer 302, and the bottom reflective layer is disposed underneath the flat first covering layer 302. One advantage of this embodiment is that, the flat first covering layer 302 in FIG. 14/15 is a thin, transparent or translucent sheet, which is convenient to print or coat at certain height of the second covering layer 304 thereon in an automatic manufacturing process, easier than on a cured, much smaller, cake-shaped first covering layer (e.g. FIG. 13).

Figure 16:
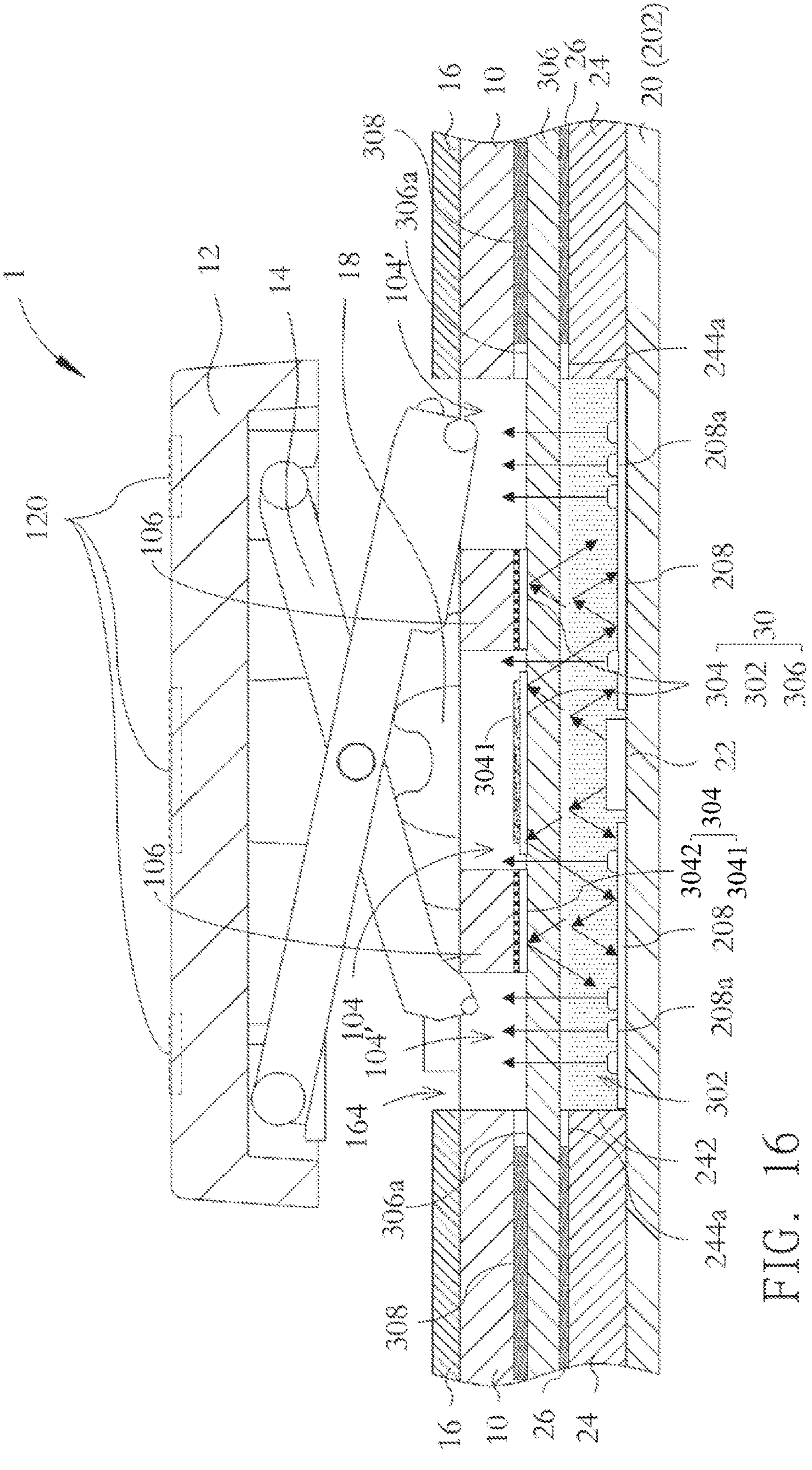
FIG. 16 is a sectional view of an illuminated keyswitch structure according to a derived embodiment.

Refer to FIG. 16, which is a sectional view of an illuminated keyswitch structure 1 according to a derived embodiment. Comparing to FIG. 13, aside from the cake-shaped first covering layer 302 and the plural reflective second covering layers 304, the light-permeable covering structure 30 in FIG. 16 further includes a flat first covering layer 306. The flat first covering layer 306 may be the same as the aforesaid flat first covering layer 302 introduced in the previous embodiments regarding to FIG. 14/15. The flat first covering layer 306 is configured between the base plate 10 and the spacer 24. Namely, the flat first covering layer 306 covers above the through hole 242 of the spacer 24 and covers above the light-emitting part 22 in the through hole 242. On top of the flat first covering layer 306, the flat first covering layer 306 includes interval adhesive 308 to bind with the base plate 10. The flat first covering layer 306 also have an annular clearance fringe 306*a* on its top surface, surrounding all the peripheral of at the bottom sides of all the corner openings 104' in FIGS. 1/14. Furthermore, the plural reflective second covering layers 304 are disposed above the flat first covering layer 306, between the flat first covering layer 306 and the base plate 10. Certain ones of the plural reflective second covering layers 304 are configured to correspond to the above rib portions 106. In addition, similar to FIG. 13, to better reuse the lights reflected from the second covering layer 304 to the first covering layer 302, the drive circuit board 20 includes plural dot reflectors 208*a* and face reflectors 208 disposed on the top surface of the drive circuit board 20 and located corresponding to the inner opening 104 and the corner openings 104' of the base plate 10. These dot reflectors 208*a* and face reflectors 208 are covered by the cake-shaped first covering layer 302, namely located under the cake-shaped first covering layer 302. Thus, lights reflected by the second covering layers 304 back to the cake-shaped first covering layer 302 are channeled to the reflectors 208*a* corresponding the corner openings 104' of the base plate. Therefore, the illuminating intensity of the inner light-transmissive portions 120 of the keycap 12 will drop, plus lights illuminating the corner light-transmissive portions 120 of the keycap 12 will be increased, so that the illumination uniformity for the entire keycap 12 can be well enhanced.

There are ways to configure the dot reflectors 208*a* and face reflectors 208 mentioned above. For example, plural parallel reinforcing ribs may be aligned across each other to form diamond-shaped rib units and diamond-shaped recesses therein. These ribs may be formed by wrapping metal mesh pieces. The surfaces of the rib units and recesses are reflective as the entire top surface of the drive circuit board 20 is made of reflective materials, or includes a reflective coating thereon. Additional high-reflectivity coating dots may be filled into a certain group of these recesses to reflect lights straight up. Even without the additional coating dots, the rib units and recesses themselves are already micro structures to reflect lights straight up. Flatting or coating other portions of recesses with non-reflective material may be able to make the non-flatting or non-coating area of the recesses and the surrounding rib units become a dedicated reflective portion for illuminating a certain one of the light-transmissive portions 120.

Through the technical solutions introduced in FIGS. 11, 12A12B/12C, 13, 14, 15 and 16, for an illuminated keyswitch 1 configured with a dedicated low-illuminance light-emitting part 22, the illumination uniformity for the entire keycap 12 can be well enhanced. Furthermore, the illumination loss caused by lights towards the rib portions 106 of base plate 10 may be resolved by the corresponding reflective second covering layers 304. In addition, a larger cake-shaped first covering layer 302 is introduced to cover the light-emitting part 22 within through hole 242 of spacer 24, which is large enough to overlap with the vertical projections of at least two of the plural openings 104/104' of the base plate 10. Such cake-shaped first covering layer 302 may have reflectors 28 thereunder to reflect recycled lights towards the corner light-transmissive portions 120 of the keycap 12 to improve the illumination uniformity. Flat first covering layer 306 is also introduced to be applied with or without cake-shaped first covering layer 302, thereby optimizing the illumination uniformity for the illuminated keyswitch structure when applying a low-illuminance light-emitting part 22.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illuminated keyswitch structure, comprising:
- a base plate, having an opening;
- a drive circuit board, having a face reflector and at least one dot reflector disposed thereon;
- a spacer, adhered on the drive circuit board, the spacer having a through hole and an adhesive-less clearance fringe at least partially surrounding the through hole;
- a light-emitting part, disposed on the drive circuit board and proximate to the face reflector and the at least one dot reflector; and
- a translucent covering structure, covering above the light-emitting part and including a reflective layer;
- wherein the reflective layer reflects off light from the light-emitting part toward the face reflector and/or the at least one dot reflector so that the light reflected up from the face reflector and/or the at least one dot reflector passes through the through hole of the spacer, and then illuminates upward through the opening of the base plate.

2. The illuminated keyswitch structure according to claim 1, wherein the reflective layer of the translucent covering structure at least partially allows light to pass therethrough.

3. The illuminated keyswitch structure according to claim 1, wherein the reflective layer of the translucent covering structure at least partially overlaps with the face reflector and/or the at least one dot reflector.

4. The illuminated keyswitch structure according to claim 1, wherein the translucent covering structure further includes a flat transparent layer covering the light-emitting part without entering into the through hole.

5. The illuminated keyswitch structure according to claim 4, wherein the spacer is adhered between the drive circuit board and the flat transparent layer of the translucent covering structure.

6. The illuminated keyswitch structure according to claim 1, wherein the through hole of the spacer overlaps the opening of the base plate.

7. The illuminated keyswitch structure according to claim 1, wherein a light-absorbing layer is disposed above the reflective layer of the translucent covering structure.

8. The illuminated keyswitch structure according to claim 7, wherein a diameter of the light-absorbing layer is smaller than that of the reflective layer.

9. The illuminated keyswitch structure according to claim 1, wherein one or both of the face reflector and the at least one dot reflector are at least partially disposed between the light-emitting part and the adhesive-less clearance fringe.

10. An illuminating module adapted to illuminate a keyswitch, comprising:

a drive circuit board, having a face reflector and at least one dot reflector disposed thereon;

a spacer, adhered on the drive circuit board, the spacer having a through hole and an adhesive-less clearance fringe at least partially surrounding the through hole;

a light-emitting part, disposed on the drive circuit board among the face reflector and the at least one dot reflector; and a translucent covering structure, covering above the light-emitting part and including a reflective layer;

wherein the reflective layer reflects off light from the light-emitting part, and the face reflector and/or the at least one dot reflector reflect light to pass through the through hole of the spacer and then illuminates upward through the translucent covering structure.

11. The illuminating module according to claim 10, wherein the reflective layer of the translucent covering structure at least partially allows light to pass therethrough.

12. The illuminating module according to claim 10, wherein the reflective layer of the translucent covering structure overlaps with at least one of the face reflector and the at least one dot reflector.

13. The illuminating module according to claim 10, wherein a light-absorbing layer is disposed above the reflective layer of the translucent covering structure.

14. The illuminating module according to claim 13, wherein a diameter of the light-absorbing layer is smaller than that of the reflective layer.

15. An illuminating module adapted to illuminate a keyswitch, comprising:

a drive circuit board, having a face reflector and at least one dot reflector disposed thereon;

a light-emitting part, disposed on the drive circuit board and located among the face reflector and the at least one dot reflector;

a translucent covering structure, covering above the light-emitting part and including a reflective layer and a flat transparent layer, the reflective layer reflecting off light of the light-emitting part; and a spacer, adhered between the flat transparent layer and the drive circuit board, the spacer having a through hole and an adhesive-less clearance fringe at least partially surrounding the through hole, so that one or both of the face reflector and the at least one dot reflector are at least partially disposed between the light-emitting part and the adhesive-less clearance fringe.

* * * * *